(12) United States Patent
Shivadas et al.

(10) Patent No.: US 9,094,737 B2
(45) Date of Patent: *Jul. 28, 2015

(54) NETWORK VIDEO STREAMING WITH TRICK PLAY BASED ON SEPARATE TRICK PLAY FILES

(71) Applicant: Sonic IP, Inc., Santa Clara, CA (US)

(72) Inventors: Abhishek Shivadas, San Diego, CA (US); Stephen R. Bramwell, San Diego, CA (US)

(73) Assignee: Sonic IP, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/905,852

(22) Filed: May 30, 2013

(65) Prior Publication Data

US 2014/0359680 A1   Dec. 4, 2014

(51) Int. Cl.
H04N 21/845    (2011.01)
H04N 21/472    (2011.01)
H04N 21/6587   (2011.01)

(52) U.S. Cl.
CPC ..... *H04N 21/8455* (2013.01); *H04N 21/47217* (2013.01); *H04N 21/6587* (2013.01)

(58) Field of Classification Search
None
See application file for complete search history.

(56) References Cited

U.S. PATENT DOCUMENTS

| | | | |
|---|---|---|---|
| 5,361,332 A | 11/1994 | Yoshida et al. | |
| 5,404,436 A | 4/1995 | Hamilton | |
| 5,479,303 A | 12/1995 | Suzuki et al. | |
| 5,502,766 A | 3/1996 | Boebert et al. | |
| 5,509,070 A | 4/1996 | Schull | |
| 5,715,403 A | 2/1998 | Stefik | |
| 5,717,816 A | 2/1998 | Boyce et al. | |
| 5,754,648 A | 5/1998 | Ryan et al. | |
| 5,805,700 A | 9/1998 | Nardone et al. | |
| 5,867,625 A | 2/1999 | Mclaren | |
| 5,887,110 A | 3/1999 | Sakamoto et al. | |
| 5,892,900 A | 4/1999 | Ginter et al. | |
| 5,946,446 A | 8/1999 | Yanagihara | |
| 5,999,812 A | 12/1999 | Himsworth | |
| 6,018,611 A | 1/2000 | Nogami et al. | |

(Continued)

FOREIGN PATENT DOCUMENTS

| | | |
|---|---|---|
| CN | 1169229 | 12/1997 |
| EP | 813167 A2 | 12/1997 |

(Continued)

OTHER PUBLICATIONS

"Informationweek: Front End: Daily Dose, Internet on Wheels", Jul. 20, 1999, 3 pgs.

(Continued)

*Primary Examiner* — Mark D Featherstone
(74) *Attorney, Agent, or Firm* — KPPB LLP

(57) ABSTRACT

Network services encode multimedia content, such as video, into multiple adaptive bitrate streams of encoded video and a separate trick play stream of encoded video to support trick play features. The trick play stream is encoded at a lower encoding bitrate and frame rate than each of the adaptive bitrate streams. The adaptive bitrate streams and the trick play stream are stored in the network services. During normal content streaming and playback, a client device downloads a selected one of the adaptive bitrate streams from network serviced for playback at the client device. To implement a trick play feature, the client device downloads the trick play stream from the network services for trick play playback.

18 Claims, 11 Drawing Sheets

(56) References Cited

U.S. PATENT DOCUMENTS

| | | | |
|---|---|---|---|
| 6,031,622 A | 2/2000 | Ristow et al. |
| 6,044,469 A | 3/2000 | Horstmann |
| 6,047,100 A | 4/2000 | McLaren |
| 6,058,240 A | 5/2000 | McLaren |
| 6,097,877 A | 8/2000 | Katayama et al. |
| 6,141,754 A | 10/2000 | Choy |
| 6,155,840 A | 12/2000 | Sallette |
| 6,175,921 B1 | 1/2001 | Rosen |
| 6,195,388 B1 | 2/2001 | Choi et al. |
| 6,222,981 B1 | 4/2001 | Rijckaert |
| 6,282,653 B1 | 8/2001 | Berstis et al. |
| 6,289,450 B1 | 9/2001 | Pensak et al. |
| 6,292,621 B1 | 9/2001 | Tanaka et al. |
| 6,389,218 B2 | 5/2002 | Gordon et al. |
| 6,418,270 B1 | 7/2002 | Steenhof et al. |
| 6,449,719 B1 | 9/2002 | Baker |
| 6,466,671 B1 | 10/2002 | Maillard et al. |
| 6,466,733 B1 | 10/2002 | Kim |
| 6,510,513 B1 | 1/2003 | Danieli |
| 6,510,554 B1 | 1/2003 | Gordon et al. |
| 6,621,979 B1 | 9/2003 | Eerenberg et al. |
| 6,658,056 B1 | 12/2003 | Duruöz et al. |
| 6,807,306 B1 | 10/2004 | Girgensohn et al. |
| 6,810,389 B1 | 10/2004 | Meyer |
| 6,859,496 B1 | 2/2005 | Boroczky et al. |
| 6,956,901 B2 | 10/2005 | Boroczky et al. |
| 6,965,724 B1 | 11/2005 | Boccon-Gibod et al. |
| 6,965,993 B2 | 11/2005 | Baker |
| 7,007,170 B2 | 2/2006 | Morten |
| 7,023,924 B1 | 4/2006 | Keller et al. |
| 7,043,473 B1 | 5/2006 | Rassool et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,185,363 B1 | 2/2007 | Narin et al. |
| 7,231,132 B1 | 6/2007 | Davenport |
| 7,242,772 B1 | 7/2007 | Tehranchi |
| 7,328,345 B2 | 2/2008 | Morten et al. |
| 7,349,886 B2 | 3/2008 | Morten et al. |
| 7,356,143 B2 | 4/2008 | Morten |
| 7,376,831 B2 | 5/2008 | Kollmyer et al. |
| 7,406,174 B2 | 7/2008 | Palmer |
| 7,472,280 B2 | 12/2008 | Giobbi |
| 7,478,325 B2 | 1/2009 | Foehr |
| 7,484,103 B2 | 1/2009 | Woo et al. |
| 7,526,450 B2 | 4/2009 | Hughes et al. |
| 7,594,271 B2 | 9/2009 | Zhuk et al. |
| 7,640,435 B2 | 12/2009 | Morten |
| 7,720,352 B2 | 5/2010 | Belknap et al. |
| 7,817,608 B2 | 10/2010 | Rassool et al. |
| 7,962,942 B1 | 6/2011 | Craner |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,065,708 B1 | 11/2011 | Smyth et al. |
| 8,201,264 B2 | 6/2012 | Grab et al. |
| 8,225,061 B2 | 7/2012 | Greenebaum |
| 8,233,768 B2 | 7/2012 | Soroushian et al. |
| 8,249,168 B2 | 8/2012 | Graves |
| 8,261,356 B2 | 9/2012 | Choi et al. |
| 8,265,168 B1 | 9/2012 | Masterson et al. |
| 8,270,473 B2 | 9/2012 | Chen et al. |
| 8,270,819 B2 | 9/2012 | Vannier |
| 8,289,338 B2 | 10/2012 | Priyadarshi et al. |
| 8,291,460 B1 | 10/2012 | Peacock |
| 8,311,115 B2 | 11/2012 | Gu et al. |
| 8,321,556 B1 | 11/2012 | Chatterjee et al. |
| 8,386,621 B2 | 2/2013 | Park |
| 8,401,900 B2 | 3/2013 | Cansler et al. |
| 8,412,841 B1 | 4/2013 | Swaminathan et al. |
| 8,456,380 B2 | 6/2013 | Pagan |
| 8,472,792 B2 | 6/2013 | Butt |
| 8,515,265 B2 * | 8/2013 | Kwon et al. ............... 386/343 |
| 8,781,122 B2 | 7/2014 | Chan et al. |
| 2001/0046299 A1 | 11/2001 | Wasilewski et al. |
| 2002/0051494 A1 | 5/2002 | Yamaguchi et al. |
| 2002/0110193 A1 | 8/2002 | Yoo et al. |
| 2002/0136298 A1 | 9/2002 | Anantharamu et al. |
| 2003/0001964 A1 | 1/2003 | Masukura et al. |
| 2003/0002578 A1 | 1/2003 | Tsukagoshi et al. |
| 2003/0035488 A1 | 2/2003 | Barrau |
| 2003/0035545 A1 | 2/2003 | Jiang |
| 2003/0035546 A1 | 2/2003 | Jiang et al. |
| 2003/0093799 A1 | 5/2003 | Kauffman et al. |
| 2003/0152370 A1 | 8/2003 | Otomo et al. |
| 2003/0163824 A1 * | 8/2003 | Gordon et al. ............... 725/90 |
| 2003/0174844 A1 | 9/2003 | Candelore |
| 2003/0185542 A1 | 10/2003 | McVeigh et al. |
| 2003/0229900 A1 | 12/2003 | Reisman |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0031058 A1 | 2/2004 | Reisman |
| 2004/0081333 A1 | 4/2004 | Grab et al. |
| 2004/0093618 A1 | 5/2004 | Baldwin et al. |
| 2004/0105549 A1 | 6/2004 | Suzuki et al. |
| 2004/0136698 A1 | 7/2004 | Mock |
| 2004/0139335 A1 | 7/2004 | Diamand et al. |
| 2004/0158878 A1 | 8/2004 | Ratnakar et al. |
| 2004/0184534 A1 | 9/2004 | Wang |
| 2004/0255115 A1 | 12/2004 | DeMello et al. |
| 2005/0038826 A1 | 2/2005 | Bae et al. |
| 2005/0071280 A1 | 3/2005 | Irwin |
| 2005/0114896 A1 | 5/2005 | Hug |
| 2005/0183120 A1 | 8/2005 | Jain et al. |
| 2005/0193070 A1 | 9/2005 | Brown et al. |
| 2005/0193322 A1 | 9/2005 | Lamkin et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0273695 A1 | 12/2005 | Schnurr |
| 2005/0275656 A1 | 12/2005 | Corbin et al. |
| 2006/0036549 A1 | 2/2006 | Wu |
| 2006/0037057 A1 | 2/2006 | Xu |
| 2006/0052095 A1 | 3/2006 | Vazvan |
| 2006/0053080 A1 | 3/2006 | Edmonson et al. |
| 2006/0064605 A1 | 3/2006 | Giobbi |
| 2006/0078301 A1 | 4/2006 | Ikeda et al. |
| 2006/0129909 A1 | 6/2006 | Butt et al. |
| 2006/0173887 A1 | 8/2006 | Breitfeld et al. |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2007/0031110 A1 | 2/2007 | Rijckaert |
| 2007/0047901 A1 | 3/2007 | Ando et al. |
| 2007/0083617 A1 | 4/2007 | Chakrabarti et al. |
| 2007/0086528 A1 | 4/2007 | Mauchly et al. |
| 2007/0136817 A1 | 6/2007 | Nguyen |
| 2007/0140647 A1 | 6/2007 | Kusunoki et al. |
| 2007/0154165 A1 | 7/2007 | Hemmeryckx-Deleersnijder et al. |
| 2007/0168541 A1 | 7/2007 | Gupta et al. |
| 2007/0168542 A1 | 7/2007 | Gupta et al. |
| 2007/0180125 A1 | 8/2007 | Knowles et al. |
| 2007/0192810 A1 | 8/2007 | Pritchett et al. |
| 2007/0217759 A1 | 9/2007 | Dodd |
| 2007/0234391 A1 | 10/2007 | Hunter et al. |
| 2007/0239839 A1 | 10/2007 | Buday et al. |
| 2007/0255940 A1 | 11/2007 | Ueno |
| 2007/0292107 A1 | 12/2007 | Yahata et al. |
| 2008/0008455 A1 | 1/2008 | De Lange et al. |
| 2008/0101466 A1 | 5/2008 | Swenson et al. |
| 2008/0120389 A1 | 5/2008 | Bassali et al. |
| 2008/0126248 A1 | 5/2008 | Lee et al. |
| 2008/0137736 A1 | 6/2008 | Richardson et al. |
| 2008/0187283 A1 | 8/2008 | Takahashi |
| 2008/0192818 A1 | 8/2008 | DiPietro et al. |
| 2008/0195744 A1 | 8/2008 | Bowra et al. |
| 2008/0256105 A1 | 10/2008 | Nogawa et al. |
| 2008/0263354 A1 | 10/2008 | Beuque |
| 2008/0279535 A1 | 11/2008 | Haque et al. |

(56) References Cited

U.S. PATENT DOCUMENTS

| | | |
|---|---|---|
| 2008/0310454 A1 | 12/2008 | Bellwood et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0066839 A1 | 3/2009 | Jung et al. |
| 2009/0097644 A1 | 4/2009 | Haruki |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0150557 A1 | 6/2009 | Wormley et al. |
| 2009/0169181 A1 | 7/2009 | Priyadarshi et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0226148 A1 | 9/2009 | Nesvadba et al. |
| 2009/0290706 A1 | 11/2009 | Amini et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0328124 A1 | 12/2009 | Khouzam et al. |
| 2009/0328228 A1 | 12/2009 | Schnell |
| 2010/0040351 A1 | 2/2010 | Toma et al. |
| 2010/0074324 A1 | 3/2010 | Qian et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0107260 A1 | 4/2010 | Orrell et al. |
| 2010/0111192 A1 | 5/2010 | Graves |
| 2010/0142917 A1 | 6/2010 | Isaji |
| 2010/0158109 A1 | 6/2010 | Dahlby et al. |
| 2010/0186092 A1 | 7/2010 | Takechi et al. |
| 2010/0189183 A1 | 7/2010 | Gu et al. |
| 2010/0228795 A1 | 9/2010 | Hahn |
| 2010/0235472 A1 | 9/2010 | Sood et al. |
| 2010/0319017 A1 | 12/2010 | Cook |
| 2011/0047209 A1 | 2/2011 | Lindholm et al. |
| 2011/0066673 A1 | 3/2011 | Outlaw |
| 2011/0080940 A1 | 4/2011 | Bocharov |
| 2011/0082924 A1 | 4/2011 | Gopalakrishnan |
| 2011/0126191 A1 | 5/2011 | Hughes et al. |
| 2011/0129011 A1 | 6/2011 | Cilli et al. |
| 2011/0135090 A1 | 6/2011 | Chan |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0197237 A1 | 8/2011 | Turner |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0268178 A1 | 11/2011 | Park |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon et al. |
| 2012/0023251 A1 | 1/2012 | Pyle et al. |
| 2012/0093214 A1 | 4/2012 | Urbach |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0179834 A1 | 7/2012 | Van Der et al. |
| 2012/0254455 A1 | 10/2012 | Adimatyam et al. |
| 2012/0260277 A1 | 10/2012 | Kosciewicz |
| 2012/0278496 A1 | 11/2012 | Hsu |
| 2012/0307883 A1 | 12/2012 | Graves |
| 2012/0311094 A1* | 12/2012 | Biderman et al. ............ 709/219 |
| 2013/0019107 A1 | 1/2013 | Grab et al. |
| 2013/0019273 A1 | 1/2013 | Ma et al. |
| 2013/0044821 A1 | 2/2013 | Braness et al. |
| 2013/0046902 A1 | 2/2013 | Villegas Nuñez et al. |
| 2013/0061040 A1 | 3/2013 | Kiefer et al. |
| 2013/0061045 A1 | 3/2013 | Kiefer et al. |
| 2013/0114944 A1 | 5/2013 | Soroushian et al. |
| 2013/0128962 A1 | 5/2013 | Rajagopalan et al. |
| 2013/0166765 A1 | 6/2013 | Kaufman |
| 2013/0166906 A1 | 6/2013 | Swaminathan et al. |
| 2014/0101722 A1 | 4/2014 | Moore |
| 2014/0189065 A1 | 7/2014 | Schaar et al. |
| 2014/0201382 A1 | 7/2014 | Shivadas et al. |
| 2014/0250473 A1 | 9/2014 | Braness et al. |

FOREIGN PATENT DOCUMENTS

| | | |
|---|---|---|
| EP | 936812 A1 | 8/1999 |
| EP | 1553779 A1 | 7/2005 |
| JP | 08046902 A | 2/1996 |
| JP | 8111842 A | 4/1996 |
| JP | 09-037225 | 2/1997 |
| JP | 11164307 A | 6/1999 |
| JP | 11275576 A | 10/1999 |
| JP | 2001346165 A | 12/2001 |
| JP | 2002518898 A | 6/2002 |
| JP | 2004515941 A | 5/2004 |
| JP | 2004187161 A | 7/2004 |
| JP | 2007235690 A | 9/2007 |
| KR | 669616 | 9/2007 |
| WO | 9613121 | 5/1996 |
| WO | 9965239 A2 | 12/1999 |
| WO | 0165762 A2 | 9/2001 |
| WO | 0235832 A2 | 5/2002 |
| WO | 0237210 A2 | 5/2002 |
| WO | 02054196 A2 | 7/2002 |
| WO | 2004102571 A1 | 11/2004 |
| WO | 2009065137 A1 | 5/2009 |
| WO | 2010060106 A1 | 5/2010 |
| WO | 2010122447 A1 | 10/2010 |
| WO | 2011068668 A1 | 6/2011 |
| WO | 2011103364 A1 | 8/2011 |
| WO | 2012094171 A1 | 7/2012 |
| WO | 2012094181 A2 | 7/2012 |
| WO | 2012094189 A1 | 7/2012 |
| WO | 2013032518 A2 | 3/2013 |
| WO | 2013032518 A3 | 9/2013 |

OTHER PUBLICATIONS

"Netflix turns on subtitles for PC, Mac streaming", 3 pgs.

"Supplementary European Search Report for Application No. EP 10834935, International Filing Date Nov. 15, 2010, Search Completed May 27, 2014, 9 pgs."

"Supported Media Formats", Supported Media Formats, Android Developers, Nov. 27, 2013, 3 pgs.

"Thread: SSME (Smooth Streaming Medial Element) config.xml review (Smooth Streaming Client configuration file)", 3 pgs.

"Transcoding Best Practices", From movideo, Nov. 27, 2013, 5 pgs.

"Using HTTP Live Streaming", iOS Developer Library, Retrieved from: http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, 10 pgs.

Akhshabi et al., "An Experimental Evaluation of Rate-Adaptation Algorithms in Adaptive Streaming over HTTP", MMSys'11, Feb. 24-25, 2011, 12 pgs.

Anonymous, "Method for the encoding of a compressed video sequence derived from the same video sequence compressed at a different bit rate without loss of data", ip.com, ip.com No. IPCOM000008165D, May 22, 2012, pp. 1-9.

Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.

(56) References Cited

OTHER PUBLICATIONS

Author Unknown, "Blu-ray Movie Bitrates Here—Blu-ray Forum", printed Oct. 30, 2008 from http://forum.blu-ray.com/showthread.php?t=3338, 6 pgs.
Author Unknown, "Entropy and Source Coding (Compression)", TCOM 570, Sep. 1999, pp. 1-22.
Author Unknown, "MPEG-4 Video Encoder: Based on International Standard ISO/IEC 14496-2", Patni Computer Systems, Ltd., Publication date unknown, 15 pgs.
Author Unknown, "O'Reilly—802.11 Wireless Networks: The Definitive Guide, Second Edition", printed Oct. 30, 2008 from http://oreilly.com/catalog/9780596100520, 2 pgs.
Author Unknown, "Tunneling QuickTime RTSP and RTP over HTTP", Published by Apple Computer, Inc.: 1999 (month unknown), 6 pgs.
Author Unknown, "Turbo-Charge Your Internet and PC Performance", printed Oct. 30, 2008 from Speedtest.net—The Global Broadband Speed Test, 1 pg.
Author Unknown, "When is 54 Not Equal to 54? A Look at 802.11a, b and g Throughput", printed Oct. 30, 2008 from http://www.oreillynet.com/pub/a/wireless/2003/08/08/wireless?throughput.htm., 4 pgs.
Author Unknown, "White paper, The New Mainstream Wireless LAN Standard", Broadcom Corporation, Jul. 2003, 12 pgs.
Blaisak, "Video Transrating and Transcoding: Overview of Video Transrating and Transcoding Technologies", Ingenient Technologies, TI Developer Conference, Aug. 6-8, 2002, 22 pgs.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 17, 2010, 14 pgs.
Gannes, "The Lowdown on Apple's HTTP Adaptive Bitrate Streaming", GigaOM, Jun. 10, 2009, 12 pgs.
Garg et al., "An Experimental Study of Throughput for UDP and VoIP Traffic in IEEE 802.11b Networks", Wireless Communications and Networkings, Mar. 2003, pp. 1748-1753.
Ghosh, "Enhancing Silverlight Video Experiences with Contextual Data", Retrieved from: http://msdn.microsoft.com/en-us/magazine/ee336025.aspx, 15 pgs.
Inlet Technologies, "Adaptive Delivery to iDevices", 2 pages.
Inlet Technologies, "Adaptive delivery to iPhone 3.0", 2 pgs.
Inlet Technologies, "HTTP versus RTMP", 3 pages.
Inlet Technologies, "The World's First Live Smooth Streaming Event: The French Open", 2 pages.
Kim, Kyuheon, "MPEG-2 ES/PES/TS/PSI", Kyung-Hee University, Oct. 4, 2010, 66 pages.
Kozintsev et al., "Improving last-hop multicast streaming video over 802.11", Workshop on Broadband Wireless Multimedia, Oct. 2004, pp. 1-10.
Kurzke et al., "Get Your Content Onto Google TV", Google, Retrieved from: http://commondatastorage.googleapis.com/io2012/presentations/live%20to%20website/1300.pdf, 58 pgs.
Lang, "Expression Encoder, Best Practices for live smooth streaming broadcasting", Microsoft Corporation, 20 pgs.
Levkov, "Mobile Encoding Guidelines for Android Powered Devices", Adobe Systems Inc., Addendum B, source and date unknown, 42 pgs.
MSDN, "Adaptive streaming, Expression Studio 2.0", 2 pgs.
Nelson, "Smooth Streaming Deployment Guide", Microsoft Expression Encoder, Aug. 2010, 66 pgs.
Nelson, Mark, "Arithmetic Coding+Statistical Modeling=Data Compression: Part 1—Arithmetic Coding", Doctor Dobb's Journal, Feb. 1991, printed from http://www.dogma.net/markn/articles/arith/part1.htm, printed Jul. 2, 2003, 12 pgs.
Nelson, Michael, "IBM's Cryptolopes," Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.
Noé, Alexander, "Matroska File Format (under construction !)", Jun. 24, 2007, XP002617671, Retrieved from: http://web.archive.org/web/20070821155146/www.matroska.org/technical/specs/matroska.pdf, Retrieved on Jan. 19, 2011, pp. 1-51.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Papagiannaki et al., "Experimental Characterization of Home Wireless Networks and Design Implications", INFOCOM 2006, 25th IEEE International Conference of Computer Communications, Proceedings, Apr. 2006, 13 pgs.
Phamdo, Nam, "Theory of Data Compression", printed from http://www.data-compression.com/theoroy.html on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Schulzrinne, H. et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages.
Siglin, "HTTP Streaming: What You Need to Know", streamingmedia.com, 2010, 16 pages.
Siglin "Unifying Global Video Strategies, MP4 File Fragmentation for Broadcast, Mobile and Web Delivery", Nov. 16, 2011, 16 pgs.
Tan, Yap-Peng et al., "Video transcoding for fast forward/reverse video playback", IEEE ICIP, 2002, pp. I-713 to I-716.
Wang et al., "Image Quality Assessment: From Error Visibility to Structural Similarity", IEEE Transactions on Image Processing, Apr. 2004, vol. 13, No. 4, pp. 600-612.
Wu, Feng et al., "Next Generation Mobile Multimedia Communications: Media Codec and Media Transport Perspectives", In China Communications, Oct. 2006, pp. 30-44.
Zambelli, Alex, "IIS Smooth Streaming Technical Overview", Microsoft Corporation, Mar. 2009.
"IBM Closes Cryptolopes Unit," Dec. 17, 1997, CNET News, Retrieved from http://news.cnet.com/IBM-closes-Cryptolopes-unit/2100-1001_3206465.html, 3 pages.
"Information Technology-Coding of Audio Visual Objects—Part 2: Visual" International Standard, ISO/IEC 14496-2, Third Edition, Jun. 1, 2004, pp. 1-724.
Cloakware Corporation, "Protecting Digital Content Using Cloakware Code Transformation Technology", Version 1.2, May 2002, pp. 1-10.
European Search Report Application No. EP 08870152, Search Completed May 19, 2011, Mailed May 26, 2011, 9 pgs.
European Search Report for Application 11855103.5, search completed Jun. 26, 2014, 9 pgs.
European Search Report for Application 11855237.1, search completed Jun. 12, 2014, 9 pgs.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
International Preliminary Report on Patentability for International Application No. PCT/US2011/068276, International Filing Date Dec. 31, 2011, Issue Date Mar. 4, 2014, 23 pgs.
International Search Report and Written Opinion for International Application No. PCT/US2010/56733, International Filing Date Nov. 15, 2010, Search Completed Jan. 3, 2011, Mailed Jan. 14, 2011, 9 pgs.
International Search Report and Written Opinion for International Application PCT/US2011/066927, International Filing Date Dec. 22, 2011, Report Completed Apr. 3, 2012, Mailed Apr. 20, 2012, 14 pgs.
International Search Report and Written Opinion for International Application PCT/US2011/067167, International Filing Date Dec. 23, 2011, Report Completed Jun. 19, 2012, Mailed Jul. 2, 2012, 11 pgs.

(56) References Cited

OTHER PUBLICATIONS

International Search Report and Written Opinion for International Application PCT/US2011/068276, International Filing Date Dec. 31, 2011, Report completed Jun. 19, 2013, Mailed Jul. 8, 2013, 24 pgs.

International Search Report for International Application No. PCT/US 08/87999, date completed Feb. 7, 2009, date mailed Mar. 19, 2009, 2 pgs.

International Search Report for International Application No. PCT/US2005/025845 filed Jul. 21, 2005, report completed Feb. 5, 2007 and mailed May 10, 2007, 3 pgs.

International Search Report for International Application No. PCT/US2007/063950 filed Mar. 14, 2007, report completed Feb. 19, 2008, report mailed Mar. 19, 2008, 3 pgs.

ITS International, "Fleet System Opts for Mobile Server", Aug. 26, 1999, 1 page.

Microsoft, Microsoft Media Platform: Player Framework, "Silverlight Media Framework v1.1", 2 pages.

Microsoft, Microsoft Media Platform: Player Framework, "Microsoft Media Platform: Player Framework v2.5 (formerly Silverlight Media Framework)", 2 pages.

The Official Microsoft IIS Site, Smooth Streaming Client, 4 pages.

Written Opinion for International Application No. PT/US2005/025845 filed Jul. 21, 2005, report completed Feb. 5, 2007 and mailed May 10, 2007, 5 pgs.

Written Opinion for International Application No. PCT/US2007/063950 filed Mar. 14, 2007, report completed Mar. 1, 2008; report mailed Mar. 19, 2008, 5 pgs.

Written Opinion of the International Searching Authority for International Application No. PCT/US 08/87999, date completed Feb. 7, 2009, date mailed Mar. 19, 2009, 4 pgs.

"Adaptive Streaming Comparison", Jan. 28, 2010, 5 pgs.

"Best Practices for Multi-Device Transcoding", Kaltura Open Source Video, 13 pgs.

"IBM Spearheading Intellectual Property Protection Technology for Information on the Internet; Cryptolope Containers Have Arrived", May 1, 1996, Business Wire, Retrieved from http://www.thefreelibrary.com/IBM+Spearheading+Intellectual+Property+Protection+Technology+for...-a018239381, 6 pgs.

International Search Report and Written Opinion for International Application PCT/US14/39852, Report Completed Oct. 21, 2014, Mailed Dec. 5, 2014, 11 pgs.

Office Action for U.S. Appl. No. 13/223,210, dated Apr. 30, 2015, 14 pgs.

Office Action for U.S. Appl. No. 14/564,003, dated Apr. 17, 2015, 28 pgs.

\* cited by examiner

PROFILE MSG 500

501:
```
<?xml version="1.0" encoding="utf 8"?>
<smil xmlns="http://www.w3.org/ns/SMIL" version="3.0" baseProfile="Language">
<head />
```

`<body>`

510:
```
Trick Play -> video id="level3"
```

502:
```
<video id="level1" systemBitrate="400000" width="768" height="432">
    <param name="vbv" value="3200000" valuetype="data" />
    <param name="mime" value="V_MPEG4/ISO/AVC" valuetype="data" />
</video>
```

504:
```
<video id="level2"   systemBitrate="600000" width="768" height="432">
    <param name="vbv" value="4800000" valuetype="data" />
    <param name="mime" value="V_MPEG4/ISO/AVC" valuetype="data" />
</video>
```

505:
```
<video id="level3"   systemBitrate="150000" width="768" height="432">
    <param name="mime" value="V_MPEG4/ISO/AVC" valuetype="data" />
</video>
```

`</switch>`
`</excl>`

506:
```
<audio id ="audio1" xml:lang="und">
    <param name="reservedBandwidth" value="192000" valuetype="data" />
    <param name="mime" value="A_AAC" valuetype="data" />
</audio>
```

`</body>`
`</smil>`

FIG. 5

```
<?xml version="1.0" encoding="utf-8"?>
<smil xmlns="http://www.w3.org/ns/SMIL" version="3.0" baseProfile="Tiny">
<head />
```
— 601

<body>
    PLAYLIST MSG 600
  <excl>
    <seq>

602 
```
<video id="level1" src="http://10.180.14.232/l140.mkv" clipBegin ="40" clipEnd = "42">
  <param name="mediaSize" value="3200" valuetype="data" />
</video>
```

604 
```
<video id="level1" src="http://10.180.14.232/l142.mkv" clipBegin="42" clipEnd="44">
  <param name="mediaSize" value="2354" valuetype="data" />
</video>
```

606 
```
<video id="level1" src="http://10.180.14.232/l144.mkv" clipBegin="44" clipEnd="46">
  <param name="mediaSize" value="3750" valuetype="data" />
</video>
```

608 
```
<video id="level1" src="http://10.180.14.232/l146.mkv" clipBegin="46" clipEnd="48">
  <param name="mediaSize" value="4521" valuetype="data" />
</video>
```

</seq>
  </excl>
  <seq> 610

```
<audio id="audio1" src="http://10.180.14.232/a140.mkv" clipBegin ="40" clipdEnd="42">
  <param name="mediaSize" value="764" valuetype="data" />
</audio>
```

</seq>
</body>
</smil>

FIG. 6

NETWORK VIDEO STREAMING WITH TRICK PLAY BASED ON SEPARATE TRICK PLAY FILES

BACKGROUND

Distribution of multimedia video (also referred to herein as "media" and/or "program(s)"), such as movies and the like, from network services to a client device, may be achieved through adaptive bitrate streaming of the video. Prior to streaming, the video may be encoded at different bitrates and resolutions into multiple bitrate streams that are stored in the network services. Typically, each of the bitstreams includes time-ordered segments of encoded video.

Adaptive bitrate streaming includes determining an available streaming bandwidth at the client device, and then downloading a selected one of the different bitrate streams from the network services to the client device based on the determined available bandwidth. While streaming, the client device downloads and buffers the successive encoded video segments associated with the selected bitstream. The client device decodes the buffered encoded video segments to recover the video therein, and then plays back the recovered video on the client device, e.g., in audio-visual form.

In normal playback, the client device plays back the video recovered from each of the buffered segments in the order in which the video was originally encoded, i.e., in a forward direction. The client device may offer playback modes or features in addition to normal playback. Such additional playback features may include rewind, fast forward, skip, and so on, as is known.

The additional playback features are referred to herein as trick play features. In order to implement trick play features, such as rewind, the client device requires access to video that has already been played. Therefore, the client device may be required to store large amounts of already downloaded and played video in order to meet the demands of a selected trick play feature. However, many client devices, especially small, hand-held devices, have limited memory capacity and, therefore, may be unable to store the requisite amount of video.

BRIEF DESCRIPTION OF THE DRAWINGS

FIG. 5 is an example Profile message used in streaming.

FIG. 6 is an example Playlist message used in streaming.

Figure 1:
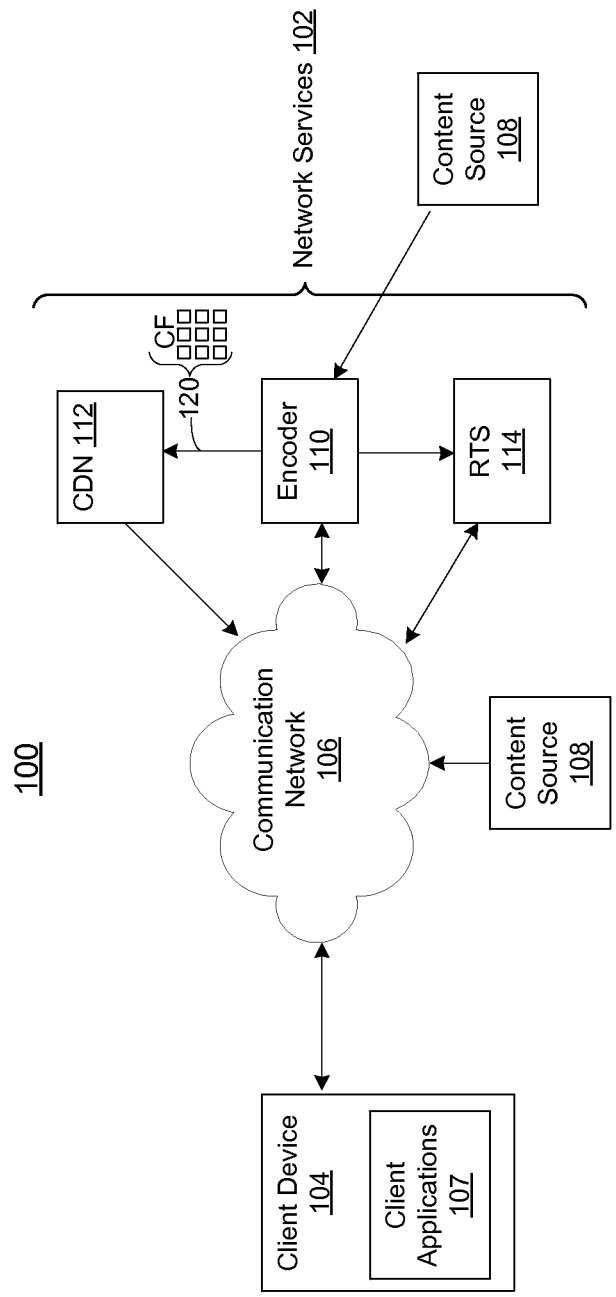
FIG. 1 is a block diagram of an example network environment that supports adaptive bitrate streaming of multimedia content, such as video, with trick play features.

In the drawings, the leftmost digit(s) of a reference number identifies the drawing in which the reference number first appears.

DETAILED DESCRIPTION

| | Table of Contents | |
|---|---|---|
| 1 | Network Environment | - 5 - |
| 2 | Container Files - Streaming Sources | - 10 - |
| 2.1 | Encoded Video Frame Structure | - 14 - |
| 3 | Sequence Diagram | - 16 - |
| 3.1 | Start-up | - 16 - |
| 3.2 | Normal Streaming and Playback | - 17 - |
| 3.3 | Trick Play | - 19 - |
| 4 | Profile and Playlist Messages | - 21 - |
| 4.1 | Profile Message | - 21 - |
| 4.2 | Playlist Message | - 22 - |
| 5 | Method Flowcharts | - 23 - |
| 5.1 | Network Side | - 23 - |
| 5.2 | Client Side | - 24 - |
| 6 | Systems | - 26 - |

1 Network Environment

FIG. 1 is a block diagram of an example network environment 100 that supports adaptive bitrate streaming of multimedia content with trick play features. Network services 102 encode multimedia content, such as video, into multiple adaptive bitrate streams of encoded video and a separate trick play stream of encoded video to support trick play features. The trick play stream may be encoded at a lower encoding bitrate and a lower frame than each of the adaptive bitrate streams. The adaptive bitrate and trick play streams are stored in network services 102. For normal content streaming and playback, a client device 104 downloads a selected one of the adaptive bitrate streams from network services 102 for playback at the client device. When a user of client device 104 selects a trick play feature, such as rewind, the client device 104 downloads the trick play stream from network services 102 for trick play playback.

Environment 100 supports trick play features in different adaptive bitrate streaming embodiments, including on-demand streaming, live streaming, and real-time streaming embodiments. On-demand streaming includes encoding the content of a program from start to end in its entirety and then, after the entire program has been encoded, streaming, i.e., downloading, the encoded program to a client device. An example of on-demand streaming includes streaming a movie from a Video-on-Demand (VOD) service to a client device.

Live streaming includes encoding successive blocks of live content, i.e., a live program, as they are received from a content source, and then streaming each encoded block as it becomes available for download. Live streaming may include streaming live scenes, i.e., video, captured with a video camera.

Real-time streaming is similar in most aspects to live streaming, except that the input to real-time streaming is not a live video feed. Rather, the input, or source, may include successive encoded blocks, or input blocks, that have a format not suitable for streaming (e.g., for a given system) and must, therefore, be decoded and re-encoded (i.e., transcoded) into an encoded format that is suitable for streaming (in the given system). Real-time streaming handles the successive incompatible input blocks similar to the way live streaming handles the successive blocks of live content.

Network environment 100 is now described in detail. Network environment 100 includes server-side or network services 102 (also referred to simply as "services 102") and client-side device 104. Network services 102 may be implemented as Internet cloud-based services. Network services 102 interact and cooperate with each other, and with client device 104, to manage and distribute, e.g., stream, multimedia content from content sources 108 to the client devices, over one or more communication network 106, such as the Internet. Network services 102 communicate with each other and with client devices 104 using any suitable communication protocol, such as an Internet protocol, which may include Transmission Control Protocol/Internet Protocol (TCP/IP), Hypertext Transfer Protocol (HTTP), etc., and other non-limiting protocols described herein.

Content sources 108 may include any number of multimedia content sources or providers that originate live and/or pre-recorded multimedia content (also referred to herein simply as "content"), and provide the content to services 102, directly, or indirectly through communication network 106. Content sources 108, such as Netflix®, HBO®, cable and television networks, and so on, may provide their content in the form of programs, including, but not limited to, entertainment programs (e.g., television shows, movies, cartoons, news programs, etc.), educational programs (e.g., classroom video, adult education video, learning programs, etc.), and advertising programs (e.g., commercials, infomercials, or marketing content). Content sources 108, such as, e.g., video cameras, may capture live scenes provide the resulting real-time video to services 102. Content sources may also include live broadcast feeds deployed using protocols such as Real-time Transport Protocol (RTP), and Real-time Messaging Protocol (RTMP).

Network services 102 include, but are not limited to: an encoder 110 to encode content from content sources 108; a content delivery network (CDN) 112 (also referred to as a "download server 112") to store the encoded content, and from which the stored, encoded content may be streamed or downloaded to client device 104; and a real-time service (RTS) 114 (also referred to as a "real-time server (RTS) 114") to (i) control services 102, and (ii) implement an RTS streaming control interface through which client device 104 may initiate and then monitor both on-demand, live, and real-time streaming sessions. Each of services 102 may be implemented as one or more distinct computer servers that execute one or more associated server-side computer program applications suited to the given service.

Encoder 110 may be implemented as a cloud encoder accessible over communication network 106. Encoder 110 encodes content provided thereto into a number of alternative bitstreams 120 (also referred to as encoded content) to support adaptive bitrate streaming of the content. For increased efficiency, encoder 110 may be implemented as a parallel encoder that includes multiple parallel encoders. In such an embodiment, encoder 110 divides the content into successive blocks or clips each of a limited duration in time. Each block may include a number of successive picture frames, referred to collectively as a group of pictures (GOPs). Encoder 110 encodes the divided blocks or GOPs in parallel to produce alternative bitstreams 120. Encoder 110 may also include transcoders to transcode input files from one encoded format to another, as necessary.

Alternative bitstreams 120 encode the same content in accordance with different encoding parameters/settings, such as at different encoding bitrates, resolutions, frame rates, and so on. In an embodiment, each of bitstreams 120 comprises a large number of sequential (i.e., time-ordered) files of encoded content, referred to herein as container files (CFs), as will be described further in connection with FIG. 2.

After encoder 110 has finished encoding content, e.g., after each of the content blocks is encoded, the encoder uploads the encoded content to CDN 112 for storage therein. CDN 112 includes one or more download servers (DSs) to store the uploaded container files at corresponding network addresses, so as to be accessible to client device 104 over communication network 106.

RTS 114 acts as a contact/control point in network services 102 for client device 104, through which the client device may initiate and then monitor its respective on-demand, live, and real-time streaming sessions. To this end, RTS 114 collects information from services 102, e.g., from encoder 110 and CDN 112, that client device 104 may use to manage its respective streaming sessions, and provides the collected information to the client device via messages (described below) when appropriate during streaming sessions, thus enabling the client device to manage its streaming sessions. The information collected by RTS 114 (and provided to client device 104) identifies the encoded content, e.g., the container files, stored in CDN 112, and may include, but is not limited to, network addresses of the container files stored in the CDN, encoding parameters use to encode the container files, such as their encoding bitrates, resolutions, and video frame rates, and file information, such as file sizes, and file types.

Client device 104 may be capable of wireless and/or wired communication with network services 102 over communication network 106, and includes processing, storage, communication, and user interface capabilities sufficient to provide all of the client device functionality described herein. Such functionality may be provided, at least in part, by one or more client applications 107, such as computer programs, that execute on client device 104. Client applications 107 may include:

a. a Graphical User Interface (GUI) through which a user of the client device may interact with and request services from corresponding server-side applications hosted in services 102. The GUI may also present trick play feature selections to the user, such as rewind and fast forward. Under user control through the GUI, client device 104 may request/select (i) programs to be streamed from services 102, and (ii) trick play features to control trick play playback of the streamed programs;

b. streaming and playback applications to stream/download the selected programs from the services, and playback, i.e., present, the streamed programs on client device 104, under user control, through the GUI; and c. a trick play application, integrated with the GUI and the streaming and playback applications, to implement the trick play features as described herein.

2 Container Files—Streaming Sources

As described above, encoder 110 encodes multimedia content from content sources 108, and CDN 112 stores the encoded content. To support adaptive bitrate streaming and trick play features, encoder 110 encodes the content at multiple encoding levels, where each level represents a distinct combination of an encoding bitrate, a video resolution (for video content), and a video frame rate, to produce (i) multiple adaptive bitrate streams for the content, and (ii) a trick play stream for the content. The multiple streams may be indexed according to their respective encoding levels. While streaming the encoded program from CDN 112, client device 104 may switch between streams, i.e., levels (and thus encoded bitrates and resolutions), according to conditions at the client device. Also, while streaming the encoded program, client device 104 may download portions of the trick play stream from CDN 112 to implement trick play features in the client device.

Figure 2:
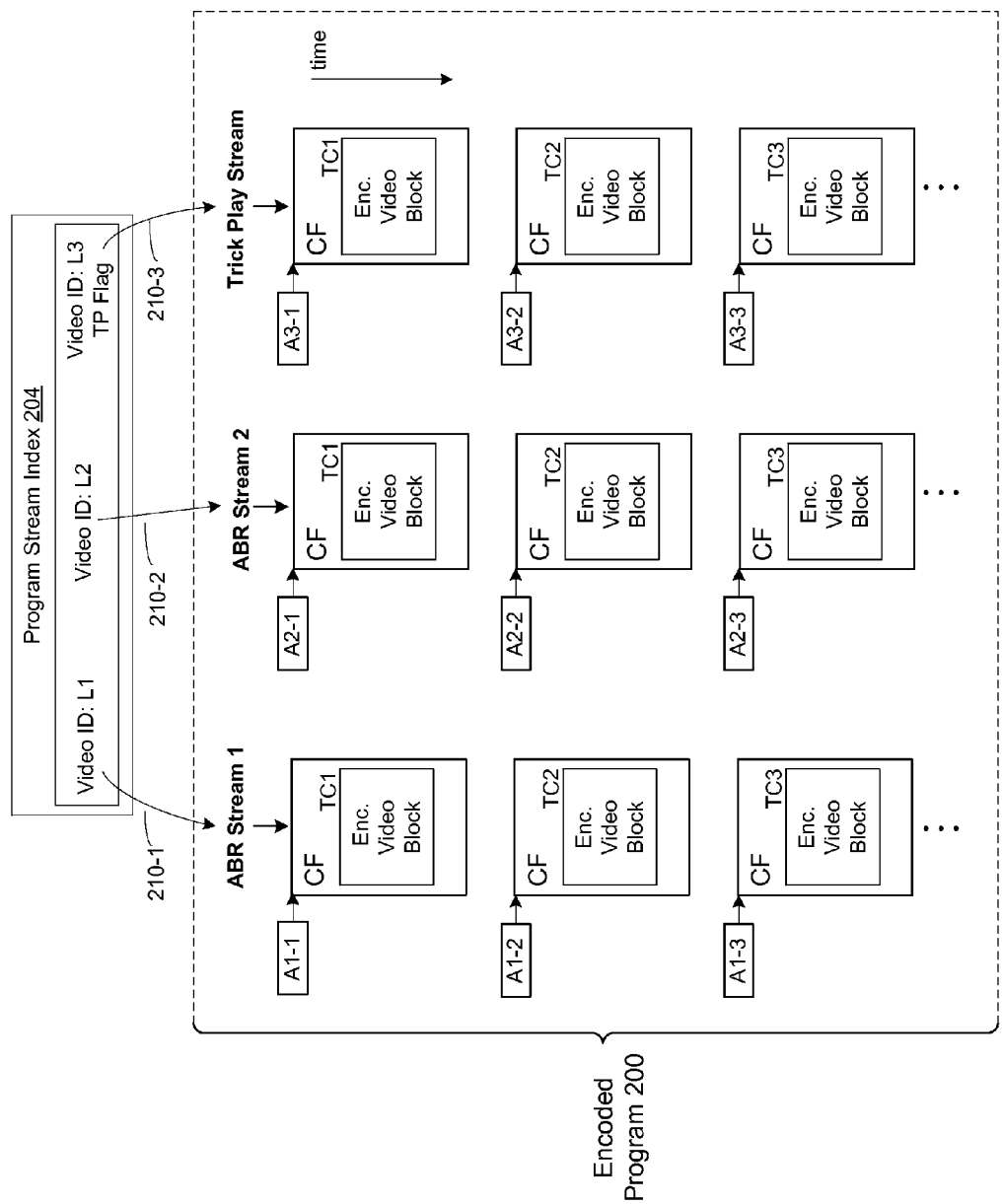
FIG. 2 is an illustration of an example encoded multimedia video program generated by and stored in network services of FIG. 1.

FIG. 2 is an illustration of an example encoded multimedia video program 200 generated by encoder 110 and stored in CDN 112. Encoded video program 200 includes:

a. two encoded adaptive bitrate (ABR) video streams 1, 2 encoded at corresponding encoding levels L1, L2 and available for adaptive bitrate streaming; and b. a trick play stream encoded at an encoding level L3. The trick play stream corresponds to, i.e., encodes the same video as, the two ABR streams 1, 2.

Each of encoding levels L1-L3 corresponds to a distinct combination of an encoding bitrate (Rate), a video resolution (Res), and a video frame rate (FR). In the example, encoding levels L1, L2, L3 correspond to encoder settings Rate1/Res1/FR1, Rate2/Res2/FR2, Rate3/Res3/FR3, respectively. In an embodiment, the encoding bitrate Rate3 and the video frame rate FR3 used to encode the trick play stream are less than the encoding bitrates Rate1, Rate2 and the frame rates FR1, FR2, respectively, used to encode adaptive bitrate streams 1, 2.

Although the example of FIG. 2 includes only two encoding levels for the ABR streams, in practice, an encoded video program typically includes many more than two levels of encoding for ABR streaming, such as 8 to 15 levels of encoding.

Each of streams 1-3 includes a distinct, time-ordered, sequence of container files CF (i.e., successive container files CF), where time is depicted in FIG. 2 as increasing in a downward vertical direction. Each of the successive container files CF, of each of streams 1-3, includes (i.e., encodes) a block or segment of video (also referred to herein as an encoded video block or segment) so that the successive container files encode successive contiguous encoded video blocks. Each of container files CF includes a time code TC to indicate a duration of the video encoded in the block of the container file, and/or a position of the container file in the succession of container files comprising the corresponding stream. The time code TC may include a start time and end time for the corresponding encoded video block. In an example in which each of container files CF encodes two seconds of video, time codes TC1, TC2, and TC3 may represents start and end times of 0s (seconds) and 2s, 2s and 4s, and 4s and 6s, respectively, and so down the chain of remaining successive container files.

The encoded blocks of the container files CF in a given stream may encode the same content (e.g., video content) as corresponding blocks in the other streams. For example, the stream 1 block corresponding to time code TC1 has encoded therein the same video as that in the stream 2 block corresponding to TC1. Such corresponding blocks encode the same content and share the same time code TC, i.e., they are aligned or coincide in time.

In an embodiment, a program stream index 204 may be associated with encoded video program 200 to identify each of the streams therein (e.g., the ABR streams 1, 2, and the trick play stream). RTS 114 may create (and store) program stream index 204 based on the information collected from encoder 110 and CDN 112, as described above in connection with FIG. 1. Then, during a live streaming session, for example, RTS 114 may provide information from program stream index 204 to client device 104 so as to identify appropriate container file addresses to the client device. Program stream index 204 may include:

a. address pointers (e.g., network addresses, such as Uniform Resource Locators (URLs)) 210-1, 210-2, 210-3 to corresponding streams 1, 2, and the trick play stream;

b. encoder parameters/settings associated with the encoded streams including, but not limited to, encoding levels L1, L2, L3 (also referred to as "Video ID" in FIG. 2, and including the encoding bitrates and resolutions Rate1/Res1, Rate2/Res2, Rate3/Res3), encoding techniques/standards, and file types and sizes of the container files CF; and c. a trick play flag (TP flag) associated with URL 210-3 that, when set, indicates the associated stream is a trick play stream.

Address pointers 210-1, 210-2, 210-3 may point to respective lists of addresses A1, A2, A3 of the container files CF comprising each of streams 1, 2, 3. Address lists A1, A2, A3 may each be represented as an array or linked list of container file network addresses, e.g., URLs. Accordingly, access to the information in program stream index 204 results in possible access to all of the container files associated with streams 1, 2, 3.

Although each of container files CF depicted in FIG. 2 represents a relatively small and simple container structure, larger and more complicated container structures are possible. For example, each container file may be expanded to include multiple clusters of encoded media, each cluster including multiple blocks of encoded media, to thereby form a larger container file also suitable for embodiments described herein. The larger container files encode an equivalent amount of content as a collection of many smaller container files.

Container files may encode a single stream, such as a video stream (as depicted in FIG. 2), an audio stream, or a text stream (e.g., subtitles). Alternatively, each container file may encode multiple multiplexed streams, such as a mix of video, audio, and text streams. In addition, a container file may encode only a metadata stream at a relatively low bitrate.

In embodiments: the container files may be Matroska (MKV) containers based on Extensible Binary Meta Language (EBML), which is a derivative of Extensible Binary Meta Language (XML), or files encoded in accordance with the Moving Picture Experts Group (MPEG) standard; the program stream index may be provided in a Synchronized Multimedia Integration Language (SMIL) format; and client device 104 may download container files from CDN 114 over networks 106 using the HTTP protocol. In other embodiments, the container file formats may include OGG, flash video (FLV), Windows Media Video (WMV), or any other format.

Exemplary, non-limiting, encoding bitrates for different levels, e.g., levels L1, L2, L3 may range from below 125 kilo-bits-per-second (kbps) up to 15,000 kbps, or even higher, depending on the type of encoded media (i.e., content). Video resolutions Res 1-Res 4 may be equal to or different from each other.

The container files may support adaptive streaming of encoded video programs across an available spectrum bandwidth that is divided into multiple, i.e., n, levels. Video having a predetermined video resolution for each level may be encoded at a bitrate corresponding to the bandwidth associated with the given level. For example, in DivX® Plus Streaming, by Rovi Corporation, the starting bandwidth is 125 kbps and the ending bandwidth is 8400 kbps, and the number n of bandwidth levels is eleven (11). Each bandwidth level encodes a corresponding video stream, where the maximum encoded bitrate of the video stream (according to a hypothetical reference decoder model of the video coding standard H.264) is set equal to the bandwidth/bitrate of the given level. In DivX® Plus Streaming, the 11 levels are encoded according to 4 different video resolution levels, in the following way: mobile (2 levels), standard definition (4 levels), 720p (2 levels), and 1080p (3 levels).

2.1 Encoded Video Frame Structure

Figure 3A:
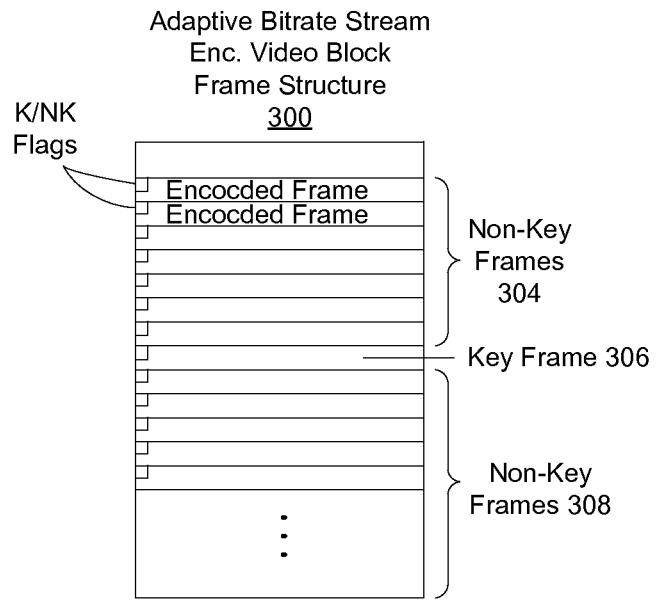
FIG. 3A is an illustration of an example adaptive bitrate frame structure of an encoded video block of FIG. 2.

FIG. 3A is an illustration of an example frame structure 300 of an encoded video block for container files from adaptive bitrate streams 1 and 2 of FIG. 2. Video encoding by encoder 110 includes capturing a number of successive picture frames, i.e., a GOP, at a predetermined video frame rate, and encoding each of the captured frames, in accordance with an encoding standard/technique, into a corresponding encoded video frame. Exemplary encoding standards include, but are not limited to, block encoding standards, such as H.264 and Moving Picture Experts Group (MPEG) standards. Collectively, the encoded video frames form an encoded video block, such as an encoded video block in one of container files CF. The process repeats to produce contiguous encoded video blocks.

The encoding process may encode a video frame independent of, i.e., without reference to, any other video frames, such as preceding frames, to produce an encoded video frame referred to herein as a key frame. For example, the video frame may be intra-encoded, or intra-predicted. Such key frames are referred to as I-Frames in the H.264/MPEG standard set. Since the key frame was encoded independent of other encoded video frames, it may be decoded to recover the original video content therein independent of, i.e., without reference to, any other encoded video frames. In the context of streaming, the key frame may be downloaded from CDN 112 to client device 104, decoded independent of other encoded frames, and the recovered (decoded) video played back, i.e., presented, on the client device.

Alternatively, the encoding process may encode a video frame based on, or with reference to, other video frames, such as one or more previous frames, to produce an encoded video frame referred to herein as a non-key frame. For example, the video frame may be inter-encoded, i.e., inter-predicted, to produce the non-key frame. Such non-key frames include P-Frames and B-frames in the H.264/MPEG standard set. The non-key frame is decoded based on one or more other encoded video frames, e.g., key-frames, reference frames, etc. In the context of streaming, the non-key frame may be downloaded from CDN 112 to client device 104, decoded based on other encoded frames, and the recovered video played back.

With reference again to FIG. 3A, frame structure 300 of the encoded video block for container files in the adaptive bitrate streams includes, in a time-ordered sequence, a first set of successive non-key frames 304, a key frame 306, and a second set of successive non-key frames 308. Accordingly, key frame 306 is interspersed among the encoded video frames of the encoded video block. The position of key frame 306 relative to the non-key frames in block 300 may vary, e.g., the position may be at the top, the middle, the bottom, or elsewhere in the block. Moreover, multiple key frames may be interspersed among the encoded video frames of the encoded video block, and separated from each other by multiple non-key frames.

A key/non-key (K/NK) flag associated with each of the frames 304, 306, and 308 indicates whether the associated frame is a key-frame or a non-key frame. Each of the key and the non-key frames may include a predetermined number of bytes of encoded video.

In an example in which the encoded video block represented by frame structure 300 encodes 2 seconds of video captured at a video frame rate of 30 frames per second (fps), the frame structure includes 60 encoded video frames, which may include N (i.e., one or more) interspersed key frames, and 60-N non-key frames. Typically, the number of non-key frames exceeds the number of key frames.

Figure 3B:
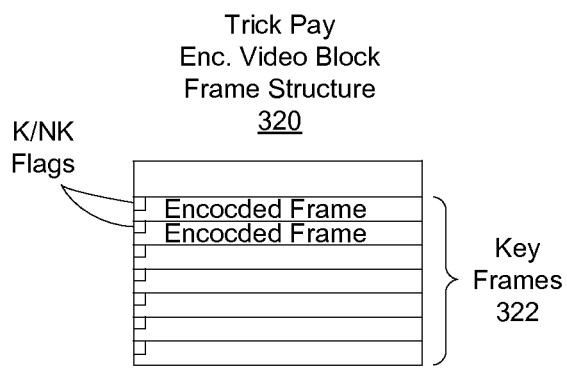
FIG. 3B is an illustration of an example trick play frame structure of an encoded video block of FIG. 2.

FIG. 3B is an illustration of an example frame structure 320 of an encoded video block for container files from the trick play stream of FIG. 2. Trick play frame structure 320 includes, in a time-ordered sequence, key frames 322. In other words, trick play frame structure 320 includes only key frames, i.e., key frames without non-key frames.

In the example in which the encoded video block represented by frame structure 300 encodes 2 seconds of video captured at a video frame rate of 30 frames per second (fps), the encoded video block represented by frame structure 320 also encodes 2 seconds of video. However the video frame rate for structure 320 is reduced to 5 fps, which yields 10 encoded video frames (key frames) every 2 seconds.

3 Sequence Diagram

Figure 4:
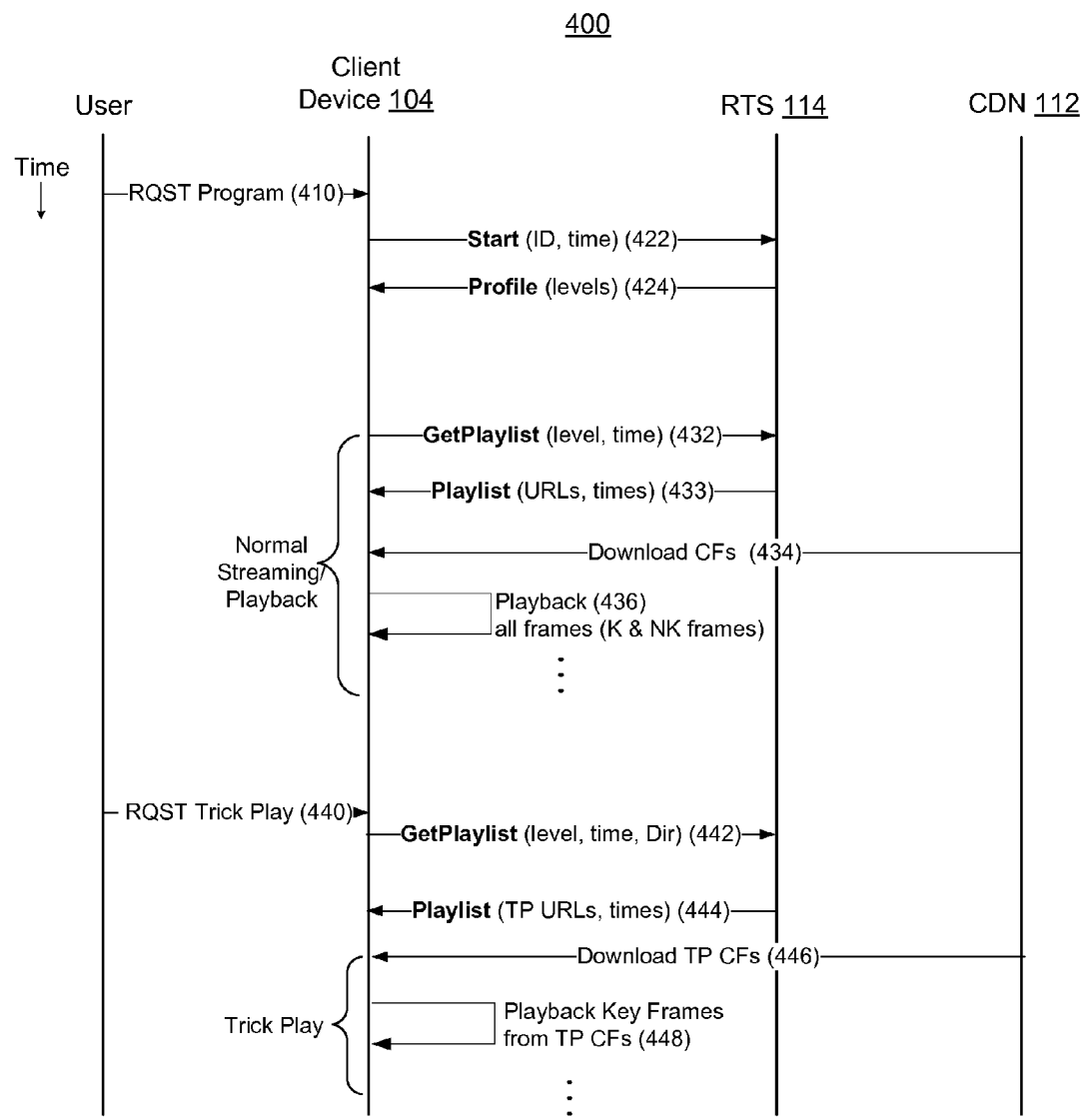
FIG. 4 is a sequence diagram of example high-level interactions between network services and a client device used to initiate streaming, implement normal streaming and playback, and implement trick play features in streaming embodiments.

FIG. 4 is a sequence diagram of example high-level interactions 400 between network services 102 and client device 104 used to initiate, i.e., start-up, streaming, implement normal streaming and playback, and implement trick play features in on-demand, live, and real-time streaming embodiments. Interactions 400 progress in time from top-to-bottom in FIG. 4, and are now described in that order. It is assumed that prior to startup, encoder 110 is in the process of, or has finished, encoding video content into multiple adaptive bitrate streams and a corresponding trick play stream, and storing the resulting container files in CDN 112 for subsequent download to client device 104.

3.1 Start-Up

At 410, a user of client device 104 selects content, such as a video program, to be streamed using the client device GUI.

At 422, client device 104 sends a "Start" message (also referred to as a "begin playback" message) to RTS 114 to start a streaming session. The Start message includes an identifier (ID) of the content to be streamed and a current time stamp. The ID identifies content from a content source that is to be streamed to client 104, and may indicate, e.g., a channel, program name, and/or source originating the content to be streamed. The current time stamp (also referred to as "current time") indicates a current time, such as a Universal Time Code (UTC). The UTC may be acquired from any available UTC time service, as would be appreciated by those or ordinary skill in the relevant arts.

As mentioned above, it is assumed that at the time the Start message is issued, the content identified therein has already been encoded and is available for streaming, e.g., for video-on-demand streaming, or will begin to be encoded shortly after the time of the Start message, e.g., for live and real-time streaming. It is also assumed that RTS 114 has collected, or will be collecting, the information related to the encoded program from encoder 110 or CDN 115, such as a program stream index, e.g., program stream index 204, sufficient to identify the identified content in network services 102.

At 424, in response to the Start message, RTS 114 sends an encoding profile message (referred to as a "Profile" message) to client 104. The Profile message lists different encoding profiles used to encode the identified content, e.g., as available from the program stream index for the identified content. Each of the profiles specifies encoding parameters/settings, including, but not limited to: content type (e.g., audio, video, or subtitle); an encoding level corresponding to an encoding bitrate, resolution, and video frame rate (e.g., levels L1, L2, L3); and a container file type, e.g., a Multipurpose Internet Mail Extensions (MIME) type. The Profile message also indicates which encoding level among the multiple encoding levels e.g., encoding level L3, represents or corresponds to a trick play stream.

In response to the Profile message, client device 104 selects an appropriate encoding level (e.g., an appropriate combination of an encoding bitrate and a resolution) among the levels indicated in the Profile message (not including the level indicating the trick play stream) for normal streaming and playback of the identified content. Client device 104 may determine the appropriate encoding level based on a communication bandwidth at the client device.

3.2 Normal Streaming and Playback

After startup, normal streaming and playback begins, as follows.

At 432, after client device 104 has selected the encoding level, the client device sends a GetPlaylist message to RTS 114 to request a list of any new container files that have been uploaded since the client device last downloaded container files (if any) from CDN 112. The GetPlaylist message includes selection criteria for uploaded container files, namely, a current time and the selected encoding level. The current time represents a time code associated with the last container file downloaded by client device 104 (if any) in the current streaming session.

In response to the GetPlaylist message, RTS 114:
a. selects the uploaded container files, as identified to the RTS that meet the criteria specified in the GetPlaylist message. The selected, uploaded container files are those container files that have (i) a time code greater than the current time, and (ii) an encoding level that matches the level specified in the GetPlaylist message from the client device;
b. generates a Playlist message identifying the selected container files; and
c. at 433, sends the Playlist message to client device 104.

For each of the selected container files, the Playlist message includes the following information: the type of content encoded in the container file (e.g., video, audio, or subtitle); an address (e.g., URL) of the container file in CDN 112 (e.g., a subset of the addresses A1 or A2); a time code, e.g., a start time and an end time, associated with the content block encoded in the container file; and a file size of the container file.

At 434, in response to the Playlist message, client device 104 downloads container files from addresses in CDN 112 based on, i.e., as identified in, the Playlist message.

At 436, client device 104 decodes all of the key frames and the non-key frames of the encoded content block from each of the downloaded container files to recover the original content therein, and then presents the recovered content, whether in audio, visual, or in other form, on client device 104. The process of decoding the encoded content from the key and non-key frames and then presenting the recovered content on client device 104 is referred to as "normal playback" on the client device. In normal playback, the content recovered from successive downloaded container files is played back on client device 104 in a forward (play) direction, i.e., in an order of increasing time code. For example, with reference again to FIG. 2, the content is played back from container files CF in the time code order of 0s-2s, 2s-4s, 4s-6s, and so on. For normal playback, the decoded video frames are presented at a frame rate equal to the frame rate at which the video was original captured and encoded, e.g., at a rate of 30 fps.

The normal streaming and playback sequence repeats. Therefore, in summary, in the streaming and playback sequence, client device 104 periodically requests and downloads Playlist messages, downloads container files indicated in the Playlist messages, and plays back the content from the downloaded container files in the forward direction.

3.3 Trick Play

At any time during the normal streaming and playback sequence, the user may select a trick play (TP) feature through the GUI. Trick play features include, but are not limited to, rewind and fast forward, in which client device 104 rewinds and fast forwards through previously played back content.

At 440, assume the user selects the rewind trick play feature while client device 104 is performing the normal playback of content.

At 442, in response to the rewind request, client device 104 sends a GetPlaylist message to RTS 114 to solicit appropriate trick play video (container files) from network services 102. Therefore, in this case, the GetPlaylist message may also be referred to as a "GetTrickPlayPlaylist" message. The GetPlaylist message sent at 442 includes the following trick play file selection criteria:
a. a time (referred to as a "trick play time") when the user selected the trick play feature;
b. the encoding level that was indicated in the Profile message (at 424) as corresponding to the trick play video (e.g., level 3 in the example of FIG. 2); and
c. a trick play direction (depicted as "Dir" in FIG. 4) indicating rewind (RWD).

At 444, in response to the GetPlaylist message sent at 442, RTS 114 generates and sends a trick play Playlist message to client device 104. The trick play Playlist message identifies those container files from the trick play stream (e.g., the stream associated with encoding level L3 in the example of FIG. 2) that meet the selection criteria, namely, that are associated with (i) successive time code less than the trick play time because the trick play direction is RWD, and (ii) an encoding level that matches the specified level (e.g., encoding level L3). The Playlist message lists URLs of the appropriate trick play container files.

At 446, client device 104 downloads the trick play container files identified in the Playlist message from 444. For example, client device 104 downloads the trick play container files from their corresponding URLs.

At 448, client device 104 plays back video from the downloaded trick play container files, i.e., the client device decodes the key frames from each of the trick play container files and then presents the decoded video in a rewind play direction, i.e., in an order of decreasing time codes beginning with the trick play time.

The trick play sequence 442-448 repeats.

During trick play, the video from the key frames may be played back at a reduced video frame rate relative to that used for normal playback. For example, the trick play playback video frame rate may be 5 fps, instead of 30 fps.

Also, to implement a faster rewind, key frames may be skipped, e.g., every other key frame may be played back. In other words, only a subset of key frames in each of the downloaded trick play container files may be used in trick play playback.

The above described trick play sequence results when the user selects RWD at 440. Alternatively, the user may select fast forward (FFWD) at 440. The trick play sequence that results when the user selects FFWD is similar to that for RWD, except that the GetPlaylist message at 442 indicates FFWD instead of RWD. In response to the FFWD indication in the GetPlaylist message, at 444, RTS 114 returns a Playlist message identifying trick play files associated with successive time codes greater than (not less than) the trick play time. Then, at 448, client device 104 plays back the downloaded trick play files in the forward direction.

4 Profile and Playlist Messages 4.1 Profile Message

FIG. 5 is an example Profile message 500. In an embodiment, the Profile message format is in accordance with the World Wide Web Consortium (W3C) recommended Extensible Markup Language (XML) markup language, Synchronized Multimedia Integration Language (SMIL) 3.0 Tiny profile. This profile is well-suited to descriptions of web-based multimedia. However, other protocols may be used to format the Profile message.

Profile message 500 includes a header 501 to specify the base profile as SMIL 3.0 (Tiny), and a body including video encoding (VE) profiles 502, 504, 505 and an audio encoding (AE) profile 506. Profile message 500 corresponds to a requested program ID, such as encoded program 200 of FIG. 2, and includes information from the associated index, e.g., index 204. Each of VE profiles 502, 504, 505 specifies the following encoding settings or parameters:
 a. a content type, e.g., video;
 b. an encoding level "Video ID" (e.g., level 1=L2, level 2=L2, level 3=L3) with its corresponding
  i. encoding bitrate (e.g., Rate1, Rate2, or Rate3, such as a bitrate=400000 bps, 600000 bps, or 150000 bps), and
  ii. video resolution (e.g., Rest, Res2, or Res3) in terms of, e.g., pixel width and height dimensions (e.g., 768× 432); and
 c. MIME type.
Similarly, AE profile 506 specifies:
 a. a content type, e.g., audio;
 b. an encoding bitrate/reserved bandwidth value (e.g., 192000); and
 c. a MIME type.
The Profile message may also include a video frame rate at which each level was encoded.

As mentioned above in connection with FIG. 4, Profile message 500 also includes a field 510 to indicate which of encoding profiles 502-505, if any, represents a trick play stream. In the example of FIG. 5, the stream associated with level 3 (similar to FIG. 2) is indicated as the trick play stream.

4.2 Playlist Message

FIG. 6 is an example Playlist message 600 generated in response to a GetPlaylist message selection criteria including a current time of 40 (seconds) and specifying a level 1 encoding level. Like the Profile message, the example Playlist message is formatted in accordance with SMIL 3.0.

Playlist message 600 includes a header 601 to specify the base profile as 3.0, and a body that includes sequential records or elements 602-610, each of which is defined as a seq element <seq>. In an embodiment, each seq element 602-610 corresponds to an uploaded container file. Using seq elements, RTS 114 is able to specify a sequence of real-time media streams for playback. A sequence tag is used with each element to indicate one of <video>, <audio> or <subtitle/text> encoded content for streaming. Elements 602-610 identify respective uploaded elements (e.g., container files) that meet the Playlist message criteria (i.e., encoding level 1 and a time code equal to or greater than 40). In the example of FIG. 6, elements 602-608 identify three container files containing successive or time-ordered two second blocks of encoded video. Element 610 identifies a container file containing a two second segment of encoded audio. Each of the Playlist message records 602-610 includes:
 a. a content type identifier (e.g., video or audio);
 b. a URL of the identified container file (e.g., src=http://10.180.14.232/1140.mkv). For example, the URLs correspond to container file addresses from the list of addresses A1 or A2 from FIG. 2;
 c. a time code in seconds (e.g., a start time and an end time, referred to as "ClipBegin" and "ClipEnd," respectively,) associated with the segment encoded in the identified container file. The example time codes for each of the container files are 40-42, 42-44, and 46-48); and
 d. a file size of the identified container file (e.g., 3200 kilobits).

5 Method Flowcharts 5.1 Network Side

Figure 7:
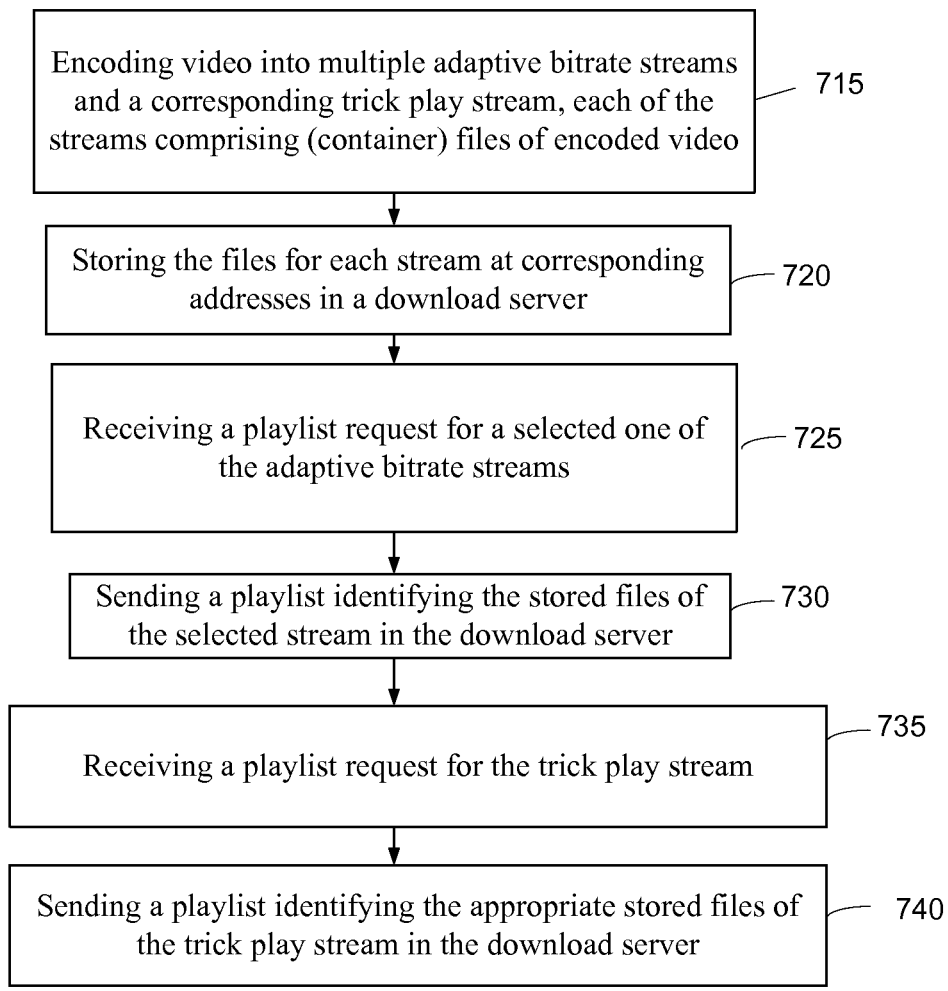
FIG. 7 is a flowchart of an example network-side method of multimedia content streaming with trick play support based on trick play files, which may be implemented in the network services of FIG. 1.

FIG. 7 is a flowchart of an example network-side method 700 of multimedia content streaming with trick play support based on trick play files, which may be implemented in network services 102. Method 700 may be executed in accordance with sequence 400 of FIG. 4. The multimedia content includes video, and may also include audio and/or text (e.g., subtitles). Method 700 may be implemented in any of the contexts of on-demand, live, and real-time streaming

715 includes encoding video into (i) multiple adaptive bitrate streams, and (ii) a corresponding trick play stream in accordance with corresponding distinct sets of encoder settings or levels, such as an encoding bitrate, a resolution, and a video frame rate. Each of the streams comprises container files of encoded video associated with successive time codes.

720 includes storing (i) the container files for each stream at corresponding addresses, such as network addresses, e.g., URLs, in a download server, e.g., in CDN 114, and (ii) an index identifying the container files of each stream in RTS 114.

725 includes receiving a playlist request (e.g., a GetPlaylist message) from a client device, e.g., over a communication network, for a selected one of the adaptive bitrate streams. The playlist request includes container file selection criteria, including a current time, an encoding level.

730 includes sending, to the client device over the communication network, a playlist (e.g., a Playlist message) identifying the stored files of the selected stream that meet the selection criteria, i.e., that are associated with time codes greater than the current time. The playlist may list URLs where the identified container files are stored and sizes of the files.

735 includes receiving, from the client device, a playlist request (e.g., another GetPlaylist message) for the trick play stream corresponding to the selected stream. The trick play playlist request includes a trick play time code, a trick play encoding level, and a trick play direction, e.g., fast forward or rewind.

740 includes sending, to the client device, a trick play playlist (e.g., another Playlist message) identifying the stored files (e.g., URLs of the stored files) of the trick play stream that are associated with successive time codes that are (i) less than the trick play time if the trick play direction is rewind, and (ii) greater than the trick play time if the trick play direction is fast forward.

5.2 Client Side

Figure 8:
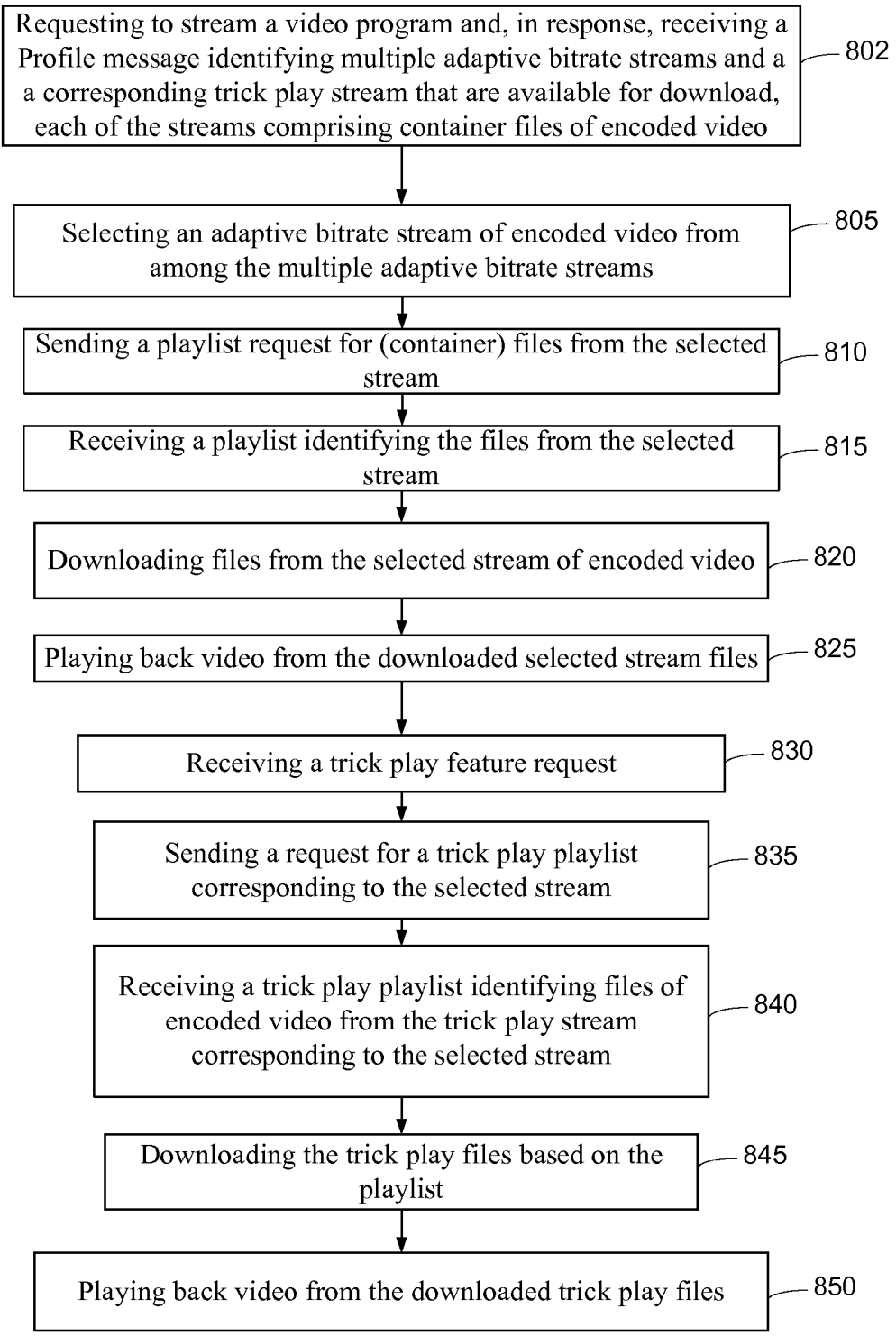
FIG. 8 is a flowchart of an example client-side method of multimedia content streaming with trick play support based on trick play files, which may be implemented in the client device of FIG. 1.

FIG. 8 is a flowchart of an example client-side method 800 of multimedia content streaming with trick play support based on trick play files, which may be implemented in client device 104. Method 800 is a client side method complementary to network side method 700. Method 800 may be executed in accordance with sequence 400 of FIG. 4. The multimedia content includes video, and may also include audio and/or text (e.g., subtitles). Method 700 may be implemented in any of the contexts of on-demand, live, and real-time streaming.

Together, operations 802-815 described below are considered precursor, or initialization, operations that lead to subsequent downloading of an adaptive bitrate stream.

802 includes requesting to stream a video program from network services over a communication network and, in response, receiving a Profile message over the communication network identifying multiple adaptive bitrate streams of encoded video and a trick play stream of encoded video that are stored in, and available for streaming from, network services. The streams may be identified according to their respective encoding levels (e.g., encoding bitrate, resolution, frame rate, etc.). Each of the streams comprises container files of the encoded video. The container files of each stream are associated with successive time codes.

805 includes selecting an adaptive bitrate stream from among the multiple adaptive bitrate streams. A client device may select an adaptive bitrate stream based an available communication bandwidth.

810 includes sending, to the network services over the communication network, a playlist request (e.g., a GetPlaylist message) for (container) files from the selected stream. The playlist request includes file selection criteria that includes a current time and specifies an encoding level corresponding to, e.g., an encoding bitrate and a resolution, of the selected stream.

815 includes receiving, from the network services over the communication network, a playlist (e.g., a Playlist message) identifying the files from the selected stream that meet the file selection criteria, i.e., that are associated with successive time codes greater than the current time.

820 includes downloading, from the network services over the communication network, files of encoded video from the selected stream as identified in the playlist, e.g., from URLs listed in the playlist.

825 includes playing back video from the downloaded files in an order of increasing time codes. This includes playing back video from both key and non-key frames at a normal video frame rate, such as 30 fps.

830 includes receiving a trick play feature request, such as a video rewind request, from a user of the client device. Next operations 835-850 are performed in response to the trick play request received at 830.

835 includes sending, to the network services over the communication network, a trick play playlist request (e.g., a GetTrickPlayPlaylist message) for appropriate trick play files from the trick play stream corresponding to the selected stream. The request includes a trick play time (corresponding to a time when the user selected the trick play feature), a trick play encoding level as indicated in the Profile message received earlier by the client device at 802 (e.g., level L3), and a trick play direction (e.g., rewind or fast forward).

840 includes receiving, from the network services over the communication network, a trick play playlist (e.g., a Playlist message) identifying files from the trick play stream that meet the file selection criteria, i.e., that are associated with successive time codes (i) less than the trick play time if the direction is rewind, and (ii) greater than the trick play time if the direction is fast forward.

845 includes downloading the trick play files identified in the playlist from 840, e.g., from URLs listed in the playlist.

850 includes playing back video from the downloaded files in either the rewind direction, i.e., in an order of decreasing time codes, or in the forward direction, as appropriate. This includes playing back video only from key frames at a trick play video frame rate, such as 5 fps, which is reduced relative to the normal frame rate.

6 Systems

Figure 9A:
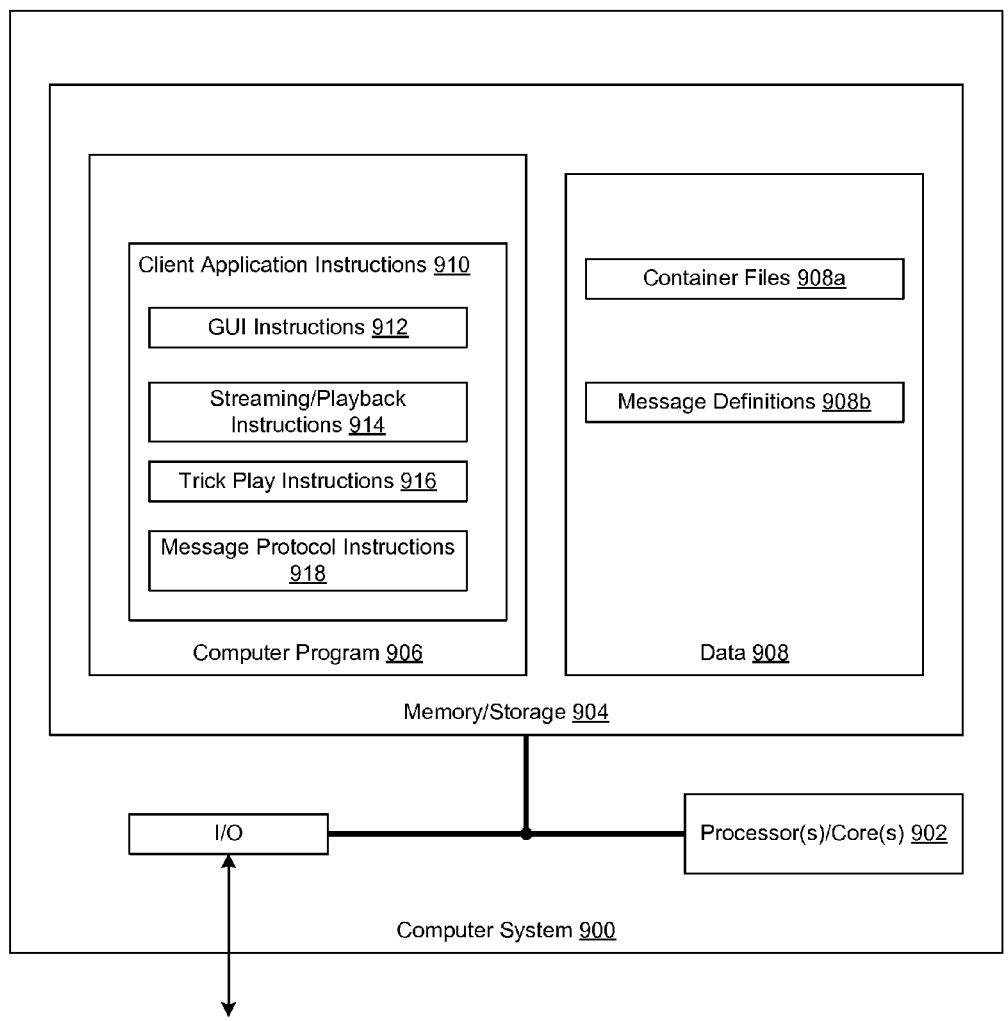
FIG. 9A is a block diagram of an example computer system.

FIG. 9A is a block diagram of a computer system 900 configured to support/perform streaming and trick play features as described herein.

Computer system 900 includes one or more computer instruction processing units and/or processor cores, illustrated here as processor 902, to execute computer readable instructions, also referred to herein as computer program logic.

Computer system 900 may include memory, cache, registers, and/or storage, illustrated here as memory 904, which may include a non-transitory computer readable medium encoded with computer programs, illustrated here as computer program 906.

Memory 904 may include data 908 to be used by processor 902 in executing computer program 906, and/or generated by processor 902 during execution of computer program 906. Data 908 may include container files 908a from adaptive bitrate streams and trick play streams, and message definitions 908b for GetPlaylist, Playlist, and Profile messages, such as used in the methods described herein.

Computer program 906 may include:

Client application instructions 910 to cause processor 902 to perform client device functions as described herein. Instructions 910 include:

GUI instructions 912 to implement a GUI through which a user may select to stream a program and select trick play features;

streaming and playback instructions 914 to download, decode, and playback streamed video content;

trick play instructions 916 to implement trick play features; and message protocol instructions 918 to implement client side message exchange protocols/sequences (sending and receiving of messages) as described in one or more examples above.

Instructions 910-918 cause processor 902 to perform functions such as described in one or more examples above.

Figure 9B:
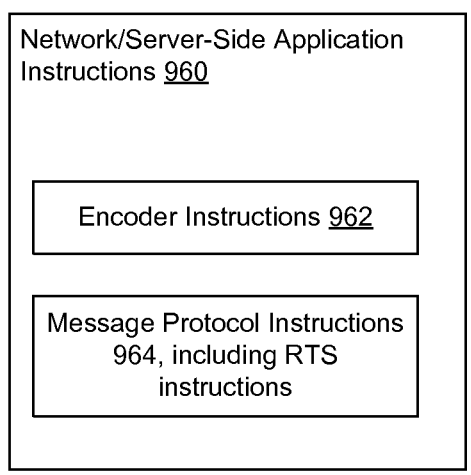
FIG. 9B is a block diagram of network/server-side application instructions which may execute in on a processor system similar to that of FIG. 9A.

FIG. 9B is a block diagram of network/server-side application instructions 960 which may execute in a processing environment similar to that of computer system 900, and which may be hosted in encoder 110, RTS 114, and/or CDN 112, as appropriate.

Network/server-side application instructions 960 cause a processor to perform network-side (network services) functions as described herein. Instructions 960 have access to adaptive bitrate streams, trick play streams, indexes identifying the streams, and message definitions as described in one or more example above. Instructions 960 include:

encoder instructions 962 to encode multimedia content into adaptive bitrate streams and trick play streams, as described in one or more example above; and message protocol instructions 964, including RTS instructions, to implement network side message exchange protocols/sequences (sending and receiving of messages) in support of adaptive bitrate streaming and trick play streaming, e.g., between RTS 114, client device 104, encoder 110, and CDN 112, as described in one or more examples above. For example, instructions 964 include instructions to create and send Profile and Playlist messages, and to respond to Get-Playlist messages.

Methods and systems disclosed herein may be implemented with respect to one or more of a variety of systems including one or more consumer systems, such as described below with reference to FIGS. 10 and 11. Methods and systems disclosed herein are not, however, limited to the examples of FIGS. 10 and 11.

Figure 10:
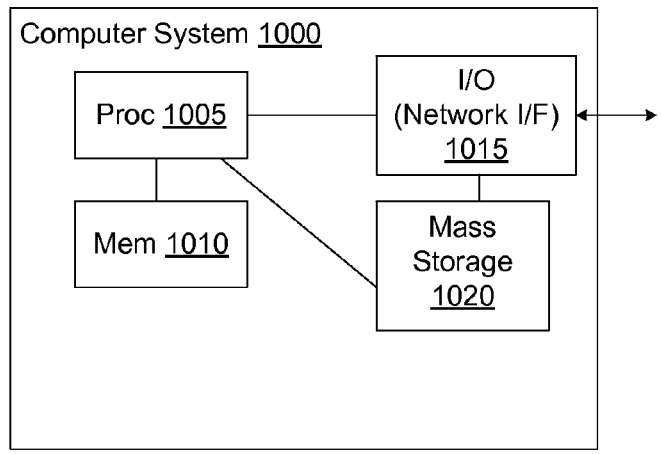
FIG. 10 is a block diagram of an example computer system corresponding to any of the network servers in the environment of FIG. 1.

FIG. 10 is a block diagram of an example computer system 1000 corresponding to any of network services 102, including encoder 110, CDN 112, and RTS 114. Computer system 1000, which may be, e.g., a server, includes one or more processors 1005, a memory 1010 in which instruction sets and databases for computer program applications are stored, a mass storage 1020 for storing, e.g., encoded programs, and an input/output (I/O) module 1015 through which components of computer system 1100 may communicate with communication network 106.

Figure 11:
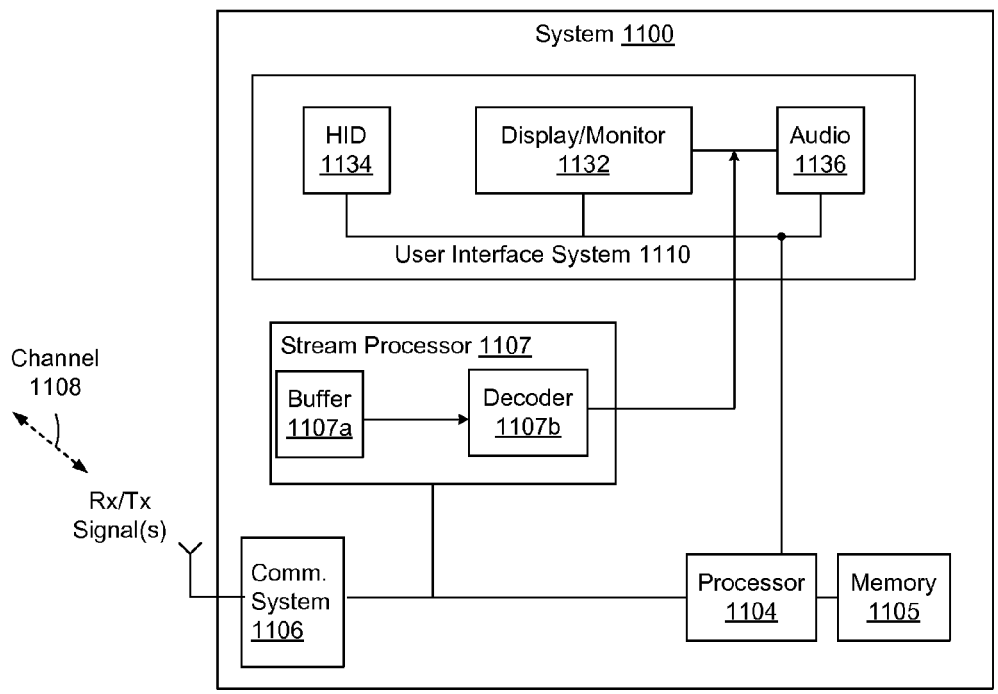
FIG. 11 is a block diagram of an example system representing a client device of FIG. 1.

FIG. 11 is a block diagram of an example system 1100 representing, e.g., client device 104, and may be implemented, and configured to operate, as described in one or more examples herein.

System 1100 or portions thereof may be implemented within one or more integrated circuit dies, and may be implemented as a system-on-a-chip (SoC).

System 1100 may include one or more processors 1104 to execute client-side application programs stored in memory 1105.

System 1100 may include a communication system 1106 to interface between processors 1104 and communication networks, such as networks 106. Communication system 1106 may include a wired and/or wireless communication system.

System 1100 may include a stream processor 1107 to process program (i.e., content) streams, received over communication channel 1108 and through communication system 1106, for presentation at system 1100. Stream processor 1107 includes a buffer 1107a to buffer portions of received, streamed programs, and a decoder 1107b to decode and decrypt the buffered programs in accordance with encoding and encryption standards, and using decryption keys. In an alternative embodiment, decoder 1107b may be integrated with a display and graphics platform of system 1100. Stream processor 1107 together with processors 1104 and memory 1105 represent a controller of system 1100. This controller includes modules to perform the functions of one or more examples described herein, such as a streaming module to stream programs through communication system 1106.

System 1100 may include a user interface system 1110.

User interface system 1110 may include a monitor or display 1132 to display information from processor 1104, such as a client-side GUI.

User interface system 1110 may include a human interface device (HID) 1134 to provide user input to processor 1104. HID 1134 may include, for example and without limitation, one or more of a key board, a cursor device, a touch-sensitive device, and or a motion and/or image sensor. HID 1134 may include a physical device and/or a virtual device, such as a monitor-displayed or virtual keyboard.

User interface system 1110 may include an audio system 1136 to receive and/or output audible sound.

System 1100 may correspond to, for example, a computer system, a personal communication device, and/or a television set-top box.

System 1100 may include a housing, and one or more of communication system 1106, processors 1104, memory 1105, user interface system 1110, or portions thereof may be positioned within the housing. The housing may include, without limitation, a rack-mountable housing, a desk-top housing, a lap-top housing, a notebook housing, a net-book housing, a set-top box housing, a portable housing, and/or other conventional electronic housing and/or future-developed housing. For example, communication system 1102 may be implemented to receive a digital television broadcast signal, and system 1100 may include a set-top box housing or a portable housing, such as a mobile telephone housing.

Methods and systems disclosed herein may be implemented in circuitry and/or a machine, such as a computer system, and combinations thereof, including discrete and integrated circuitry, application specific integrated circuitry (ASIC), a processor and memory, and/or a computer-readable medium encoded with instructions executable by a processor, and may be implemented as part of a domain-specific integrated circuit package, a system-on-a-chip (SOC), and/or a combination of integrated circuit packages.

Method and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A method of supporting video streaming with trick play, comprising:
    encoding a video into multiple adaptive bitrate streams and a corresponding trick play stream, wherein each of the adaptive bitrate streams and the trick play stream comprises files of encoded video;
    storing the files of encoded video for each of the adaptive bitrate streams and the trick play stream in sequences of successive container files, wherein each container file comprises a segment of encoded video;
    receiving a playlist request for a selected one of the adaptive bitrate streams, wherein the playlist request includes a first time;
    in response to the received playlist request, generating a playlist identifying a set of successive container files storing segments of encoded video from the selected adaptive bitrate stream, wherein the set of successive container files starts at the first time;
    receiving a trick play playlist request for the trick play stream, wherein the trick play playlist request includes a second time and a trick play direction; and
    in response to the received trick play playlist request, generating a trick play playlist identifying a different set of container files storing segments of encoded video from the trick play stream, wherein the different set of container files starts at the second time in an order based on the received trick play direction.

2. The method of claim 1, wherein:
    the encoded video in the files corresponding to the adaptive bitrate streams comprises encoded video frames, including non-key frames each encoded based on video from one or more previous video frames, and key frames interspersed among the non-key frames, each of the key frames encoded independent of previous video frames; and the encoded video in the files for the trick play stream comprises key frames without non-key frames.

3. The method of claim 1, wherein:

the successive container files for each of the adaptive bitrate streams and the trick play stream are associated with successive time codes; and the play list generated for the selected adaptive bitrate stream identifies the set of successive container files in the selected adaptive bitrate according using successive time codes greater than the first time code.

4. The method of claim 1, wherein:

the encoding includes encoding the video based on a distinct combination of an encoding bitrate and a video frame rate for each stream; and the encoding bit rate and video frame rate for the trick play stream are less than the encoding bitrates and video frame rates, respectively, for the adaptive bitrate streams.

5. The method of claim 1, wherein:

the storing includes storing the sequences of successive container files at corresponding network addresses;

the play list identifying the set of successive container files of the selected stream includes a list of the network addresses of the set of successive container files; and the playlist identifying the different set of successive container files of the trick play stream includes a list of the network addresses of the different set of successive container files.

6. The method of claim 3, wherein:

the trick play direction is a rewind direction;

the second time is greater than the first time; and the trick play playlist identifies the different set of container files in the trick play stream using successively decreasing time codes that are each less than the second time.

7. A system for supporting video streaming with trick play, comprising:

an encoder to encode video into multiple adaptive bitrate streams and a corresponding trick play stream, wherein each of the adaptive bitrate streams comprises files of encoded video;

a download server to store the files of encoded video for each of the adaptive bitrate streams and the trick play stream in sequences of successive container files, wherein each container file comprises a segment of encoded video; and a management server to:

receive a playlist request for a selected one of the adaptive bitrate streams, wherein the playlist request includes a first time;

in response to the received playlist request, generate a playlist identifying a set of successive container files storing segments of encoded video from the selected adaptive bitrate stream, wherein the set of successive container files starts at the first time;

receive a trick play playlist request for the trick play stream, wherein the trick play playlist request includes a second time and a trick play direction; and in response to the received trick play playlist request, generate a trick play playlist identifying a different set of container files storing segments of encoded video from the trick play stream, wherein the different set of container files starts at the second time in an order based on the received trick play direction.

8. The system of claim 7, wherein:

the encoded video in the files corresponding to the adaptive bitrate streams comprises encoded video frames, including non-key frames each encoded based on video from one or more previous video frames, and key frames interspersed among the non-key frames, each of the key frames encoded independent of previous video frames; and the encoded video in the files for the trick play stream comprises key frames without non-key frames.

9. The system of claim 7, wherein:

the successive container files for each of the adaptive bitrate streams and the trick play stream are associated with successive time codes; and the play list generated for the selected adaptive bitrate stream identifies the set of successive container files in the selected adaptive bitrate stream using successive time codes greater than the first time code.

10. The system of claim 7, wherein:

the encoder is further configured to encode the video based on a distinct combination of an encoding bitrate and a video frame rate for each stream; and the encoding bit rate and video frame rate for the trick play stream are less than the encoding bitrates and video frame rates, respectively, for the adaptive bitrate streams.

11. The system of claim 7, wherein:

the download server is configured to store the sequences of successive container files at corresponding network addresses;

the playlist identifying the set of successive container files of the selected stream includes a list of the network addresses of the set of successive container files; and the playlist identifying the different set of successive container files of the trick play stream includes a list of the network addresses of the different set of successive container files.

12. The system of claim 9, wherein:

the trick play direction is a rewind direction;

the second time is greater than the first time; and the trick play playlist identifies the different set of container files in the trick play stream using successively decreasing time codes that are each less than the second time.

13. A non-transitory computer readable medium encoded with a computer program including instructions to cause a processor to:

encode video into multiple adaptive bitrate streams and a corresponding trick play stream, wherein each of the adaptive bitrate streams comprises files of encoded video;

store the files of encoded video for each of the adaptive bitrate streams and the trick play stream in sequences of successive container files, wherein each container file comprises a segment of encoded video;

receive a playlist request for a selected one of the adaptive bitrate streams, wherein the playlist request includes a first time;

in response to the received playlist request, generate a playlist identifying a set of successive container files storing segments of encoded video from the selected adaptive bitrate stream, wherein the set of successive container files starts at the first time;

receive a trick play playlist request for the trick play stream, wherein the trick play playlist request includes a second time and a trick play direction; and in response to the received trick play playlist request, generate a trick play playlist identifying a different set of container files storing segments of encoded video from the trick play stream, wherein the different set of container files starts at the second time in an order based on the received trick play direction.

14. The computer readable medium of claim 13, wherein:

the encoded video in the files corresponding to the adaptive bitrate streams comprises encoded video frames, including non-key frames each encoded based on video from one or more previous video frames, and key frames interspersed among the non-key frames, each of the key frames encoded independent of previous video frames; and the encoded video in the files for the trick play stream comprises key frames without non-key frames.

15. The computer readable medium of claim 13, wherein:

the successive container files for each of the adaptive bitrate streams and the trick play stream are associated with successive time codes; and the playlist generated for the selected adaptive bitrate stream identifies the set of successive container files in the selected adaptive bitrate stream using successive time codes greater than the first time code.

16. The computer readable medium of claim 13, wherein:

the instruction to cause the processor to encode include instructions to cause the processor to encode the video based on a distinct combination of an encoding bitrate and a video frame rate for each stream; and the encoding bit rate and video frame rate for the trick play stream are less than the encoding bitrates and video frame rates, respectively, for the adaptive bitrate streams.

17. The computer readable medium of claim 13, wherein:

the instruction to cause the processor to store include instructions to cause the processor to store the sequences of successive container files at corresponding network addresses;

the playlist identifying the set of successive container files of the selected stream includes a list of the network addresses of the set of successive container files; and the playlist identifying the different set of successive container files of the trick play stream includes a list of the network addresses of the different set of successive container files.

18. The computer readable medium of claim 15, wherein:

the trick play direction is a rewind direction;

the second time is greater than the first time; and the trick play playlist identifies the different set of container files in the trick play stream using successively decreasing time codes that are each less than the second time.

* * * * *